United States Patent
Zhang et al.

(10) Patent No.: US 11,570,706 B2
(45) Date of Patent: Jan. 31, 2023

(54) OPERATION MODES FOR L1/L2-CENTRIC INTER-CELL MOBILITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/131,138

(22) Filed: Dec. 22, 2020

(65) Prior Publication Data

US 2021/0195513 A1     Jun. 24, 2021

Related U.S. Application Data

(60) Provisional application No. 62/969,496, filed on Feb. 3, 2020, provisional application No. 62/965,718, filed
(Continued)

(51) Int. Cl.
    *H04W 48/20*      (2009.01)
    *H04W 72/04*      (2009.01)
(Continued)

(52) U.S. Cl.
CPC .......... *H04W 48/20* (2013.01); *H04W 24/10* (2013.01); *H04W 48/16* (2013.01); *H04W 72/04* (2013.01)

(58) Field of Classification Search
CPC . H04W 88/085; H04W 88/08; H04W 72/085; H04W 72/0453; H04W 72/04;
(Continued)

(56) References Cited

U.S. PATENT DOCUMENTS 9,537,936 B2 *   1/2017   Eklund ................ H04W 88/08
10,159,075 B2 *   12/2018   Ramamurthi ..... H04W 72/0453
(Continued)

FOREIGN PATENT DOCUMENTS

CN           105120467 A   *   12/2015          H04B 7/2609
WO     WO-2014098504 A1   *   6/2014          H04W 48/16

OTHER PUBLICATIONS

J. Johansson, W. A. Hapsari, S. Kelley and G. Bodog, "Minimization of drive tests in 3GPP release 11," in IEEE Communications Magazine, vol. 50, No. 11, pp. 36-43, Nov. 2012, doi: 10.1109/MCOM.2012.6353680. (Year: 2012).*
(Continued)

*Primary Examiner* — William D Cumming
(74) *Attorney, Agent, or Firm* — Loza & Loza, LLP

(57) ABSTRACT

Aspects relate to Layer 1/Layer 2-centric inter-cell mobility communication systems where measurement information from at least one user equipment (UE) is sent to a base station. Based on this information, the base station may select at least one of a remote radio head (RRH), a serving cell, or a cell assigned with a physical cell ID that serves a particular UE using one of Layer 1 or Layer 2 control signaling based on the received measurement information and a system serving cell configuration or mode of operation. Additionally, an indication may be provided of whether cell configurations are the same for target and source cells in an inter-cell handover and a UE may utilize the same source cell configuration during a handover when connecting with the target cell when the configurations match or at least partially match.

35 Claims, 14 Drawing Sheets

Related U.S. Application Data on Jan. 24, 2020, provisional application No. 62/953,149, filed on Dec. 23, 2019.

(51) Int. Cl.
  *H04W 48/16* (2009.01)
  *H04W 24/10* (2009.01)

(58) Field of Classification Search
  CPC ... H04W 36/0061; H04W 4/60; H04W 24/08; H04W 24/10; H04W 72/048; H04W 48/16; H04W 48/20; H04W 28/06
  USPC .......................................................... 370/329
  See application file for complete search history.

(56) References Cited

U.S. PATENT DOCUMENTS

| | | | | |
|---|---|---|---|---|
| 10,531,464 | B2* | 1/2020 | Ramamurthi | H04W 24/10 |
| 10,674,514 | B2* | 6/2020 | Nakazawa | H04W 72/048 |
| 11,006,427 | B2* | 5/2021 | Nakazawa | H04W 72/048 |
| 2013/0322581 | A1* | 12/2013 | Piirainen | H04L 25/03343 |
| | | | | 375/343 |
| 2014/0204895 | A1* | 7/2014 | Frederiksen | H04W 4/60 |
| | | | | 370/329 |
| 2014/0304318 | A1* | 10/2014 | Eklund | H04W 88/08 |
| | | | | 709/201 |
| 2017/0238301 | A1* | 8/2017 | Nakazawa | H04W 28/06 |
| | | | | 370/329 |
| 2018/0279182 | A1 | 9/2018 | Sang et al. | |
| 2018/0288764 | A1* | 10/2018 | Ramamurthi | H04W 24/08 |
| 2019/0069300 | A1* | 2/2019 | Ramamurthi | H04B 7/12 |
| 2020/0245318 | A1* | 7/2020 | Nakazawa | H04L 27/26 |
| 2020/0314738 | A1 | 10/2020 | Qi | |
| 2021/0195513 | A1* | 6/2021 | Zhang | H04W 24/10 |
| 2021/0227533 | A1* | 7/2021 | Zhang | H04W 56/00 |
| 2021/0258943 | A1* | 8/2021 | Nakazawa | H04J 11/00 |

OTHER PUBLICATIONS

A. A. R. Alsaeedy and E. K. P. Chong, "Tracking Area Update Procedure Unnecessary in 5G: Improving User Experience and Offloading Signaling Overhead," 2018 9th IEEE Annual Ubiquitous Computing, Electronics & Mobile Communication Conference (UEMCON), Nov. 2018, pp. 854-860, (Year: 2018).*

I. Kim, J. Um and S. Park, "Implementation of SDR-based 5G NR Cell Search Equipment," 2020 22nd International Conference on Advanced Communication Technology (ICACT), 2020, pp. 350-353, doi: 10.23919/ICACT48636.2020.9061404. (Year: 2020).*

CMCC: "Mobility Management for Connected Mode in NR", 3GPP TSG RAN WG2 Meeting #94, 3GPP Draft; R2-163719 Mobility Management for Connected Mode in NR, 3rd Generation Partnership Project (3GPP), Mobile Compeience Centre; 650, Route Des Lucioles; F-06921 Sophia-Antipolis Cedex; FRA vol. RAN WG2, No. Nanjing, China; May 23, 2016-May 27, 2016, May 22, 2016 (May 22, 2016), 4 Pages, XP051105132.

Ericsson: "Lower-Layer Mobility Enhancements", 3GPP Draft; 3GPP TSG-RAN WG1 Meeting #96, R1-1902528 Lower-Layer Mobility Enhancements, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 15, 2019, XP051600224, Retrieved from the Internet: URL:http://www.3gpp.org/ftp/tsg%5Fran/WG1%5FRL1/TSGR1%5F96/Docs/R1%2D1902528%2Ezip [retrieved on Feb. 15, 2019], 8 pages, sections 2.1 and 2.2.

Huawei, et al., "Overview of Rel-17 Work Areas for NR and LTE", 3GPP TSG RAN Meeting #84, RP-191486, Overview of Rel-17 Work Areas for NR and LTE Final (Was RP-191007), 3rd Generation Partnership Project (3GPP), Mobile Competence Centre, 650, Route Des Lucioles, F-06921 Sophia vol. TSG RAN, No. Newport Beach, USA, Jun. 3, 2019-Jun. 6, 2019, Jun. 4, 2019 (Jun. 4, 2019), 22 Pages, XP051748412.

International Search Report and Written Opinion—PCT/US2020/066877—ISA/EPO—dated Apr. 1, 2021.

* cited by examiner

OPERATION MODES FOR L1/L2-CENTRIC INTER-CELL MOBILITY

PRIORITY CLAIM

This application claims priority to and the benefit of provisional application No. 62/953,149 filed in the U.S. Patent and Trademark Office on Dec. 23, 2019, provisional application No. 62/965,718 filed in the U.S. Patent and Trademark Office on Jan. 24, 2020, and provisional application No. 62/969,496 filed in the U.S. Patent and Trademark Office on Feb. 3, 2020, the entire contents of which are incorporated herein by reference as if fully set forth below in its entirety and for all applicable purposes.

TECHNICAL FIELD

The technology discussed below relates generally to wireless communication systems, and more particularly, to operation modes for Layer 1 (L1)/Layer 2 (L2)-centric inter-cell mobility.

INTRODUCTION

In particular wireless technologies and standards such as the evolving 3GPP 5G New Radio (NR) standard, particular high frequency transmission waveforms and protocols, as well as the use of multiple transmission/reception points (multi-TRP) have been proposed. Furthermore, 5G NR standards continue to provide enhancements for multi-beam operation, particularly for high frequency transmissions (e.g., frequency range FR2, which encompass approximately 6 GHz and above), as well as for multi-TRP deployments. Some further enhancements in 5G NR include improving inter-cell mobility, which is a procedure that ensures that a wireless user equipment (UE) is able to change or hand-off from one wireless cell to another wireless cell whenever the UE detects an adjacent wireless cell with higher signal quality.

BRIEF SUMMARY OF SOME EXAMPLES

The following presents a summary of one or more aspects of the present disclosure in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect, a method for wireless communication at a radio access network (RAN) entity in a communication system supporting inter-cell mobility is disclosed. The method includes receiving a measurement report from at least one user equipment (UE) and determining reference information based on the measurement report. Additionally, the method includes selecting at least one cell to serve the at least one UE based on the reference information and a serving cell configuration of the RAN entity. Further, the method includes transmitting one of layer 1 (L1) or layer 2 (L2) signaling to the at least one UE to identify the selected at least one cell.

According to another aspect, a method for wireless communication at a user equipment (UE) in a wireless communication system supporting inter-cell mobility is disclosed including transmitting an uplink reference signal to a radio access network (RAN) entity that includes at least one of power and signal measurements. The method further includes receiving one of layer 1 (L1) or layer 2 (L2) signaling from the RAN entity that identifies one or more selected serving cells to serve the UE based on the transmitted uplink reference signal. Additionally, the method includes selecting one or more serving cells during inter-cell mobility operations based on the received L1 or L2 layer signaling.

In yet another aspect, a radio access network (RAN) entity configured for wireless communication is disclosed having a processor, a transceiver communicatively coupled to the processor, and a memory communicatively coupled to the processor. The processor and memory are configured to receive a measurement report from at least one user equipment (UE) via the transceiver and determine reference information based on the measurement report. Further, the processor and memory are configured to select at least one cell to serve the at least one UE based on the reference information and a serving cell configuration of the RAN entity. Moreover, the processor and memory are configured to transmit one of layer 1 (L1) or layer 2 (L2) signaling via the transceiver to the at least one UE to identify the selected at least one cell.

In yet one more aspect, a user equipment (UE) configured for wireless communication is disclosed having a processor, a transceiver communicatively coupled to the processor, and a memory communicatively coupled to the processor. The processor and memory are configured to transmit an uplink reference signal to a radio access network (RAN) entity that includes at least one of power and signal measurements. Additionally, the processor and memory are configured to receive one of layer 1 (L1) or layer 2 (L2) signaling from the RAN entity that identifies one or more selected serving cells to serve the UE based on the transmitted uplink reference signal. Furthermore, the processor and memory are configured to select one or more serving cells during inter-cell mobility operations based on the received L1 or L2 layer signaling.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
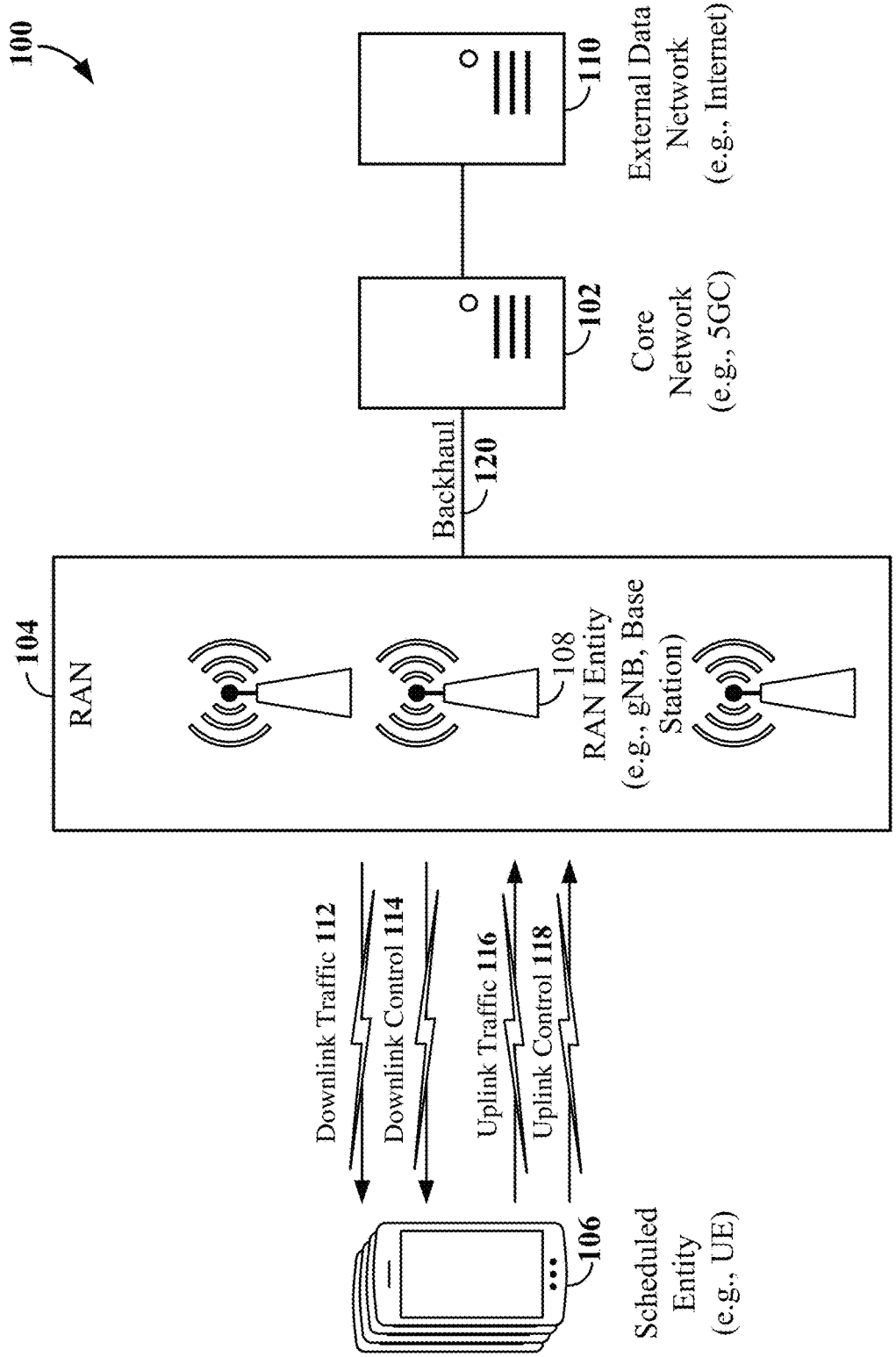
FIG. 1 is a schematic illustration of an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Of note, for 5G NR systems inter-cell mobility may be configured to be layer 1 (i.e., the L1 or PHY layer) or layer 2 (i.e., the L2 or MAC layer) centric (i.e., L1/L2-centric) rather than at higher levels (e.g., RRC). Within the 5G NR framework, various operation modes for inter-cell mobility such L1/L2-centric inter-cell mobility may be possible for different operational scenarios as will be further described herein. The present disclosure provides, in some examples, receiving, within a radio access network (RAN) entity such as a base station, an uplink measurement report from at least one user equipment (UE) via a wireless communication system employing inter-cell mobility. The RAN entity, in turn, may select at least one of a physical cell site, a serving cell, or a cell associated or assigned with a physical cell ID (PCI) that serves the at least one UE using one of layer 1 (L1) or layer 2 (L2) controls based on the received uplink measurement report and a system serving cell configuration.

In some other examples, a number of remote radio heads (RRHs) or cells that is assigned with at least one physical cell ID (PCI) may be configured to transmit a set of synchronization signal block (SSB) IDs (SSB IDs) that are selected by a network entity (e.g., RAN entity) to serve a UE. A respective frequency location for each RRH or cell assigned with the at least one PCI in the plurality of RRHs or PCIs may have a corresponding set of SSBs IDs may be selected by a RAN entity for serving at least one user equipment (UE) in the communication system, where the selection uses one of layer 1 (L1) or layer 2 (L2) control signaling. Each respective frequency location of the SSBs (e.g., a range of frequencies within the frequencies of available transmission resources where the SSBs may be located), may be transmitted for each RRH or cell associated with a PCI of the plurality of RRHs or cells associated with the PCIs to the at least one UE.

In yet other examples, a handover or hand off (HO) command may be provided in a wireless communication system for a user equipment (UE) being served by a source cell to handover to a target cell. The HO command includes a cell match indication that indicates whether a target cell configuration of the target cell is the same as a source cell configuration of the source cell. The HO command is transmitted to the UE for handover of the UE to the target cell, which executes the HO based on the included cell match indication, which allows the UE to determine if the configuration from the source cell may be reused after handing over to the target cell in order to save resources.

While aspects and features are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range in spectrum from chip-level or modular components to non-modular, non-chip-level implementations and further to aggregate, distributed, or OEM devices or systems incorporating one or more aspects of the described aspects. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

Turning to the drawings, the various concepts presented throughout this disclosure may be implemented across a broad variety of telecommunication systems, network architectures, and communication standards. Referring to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
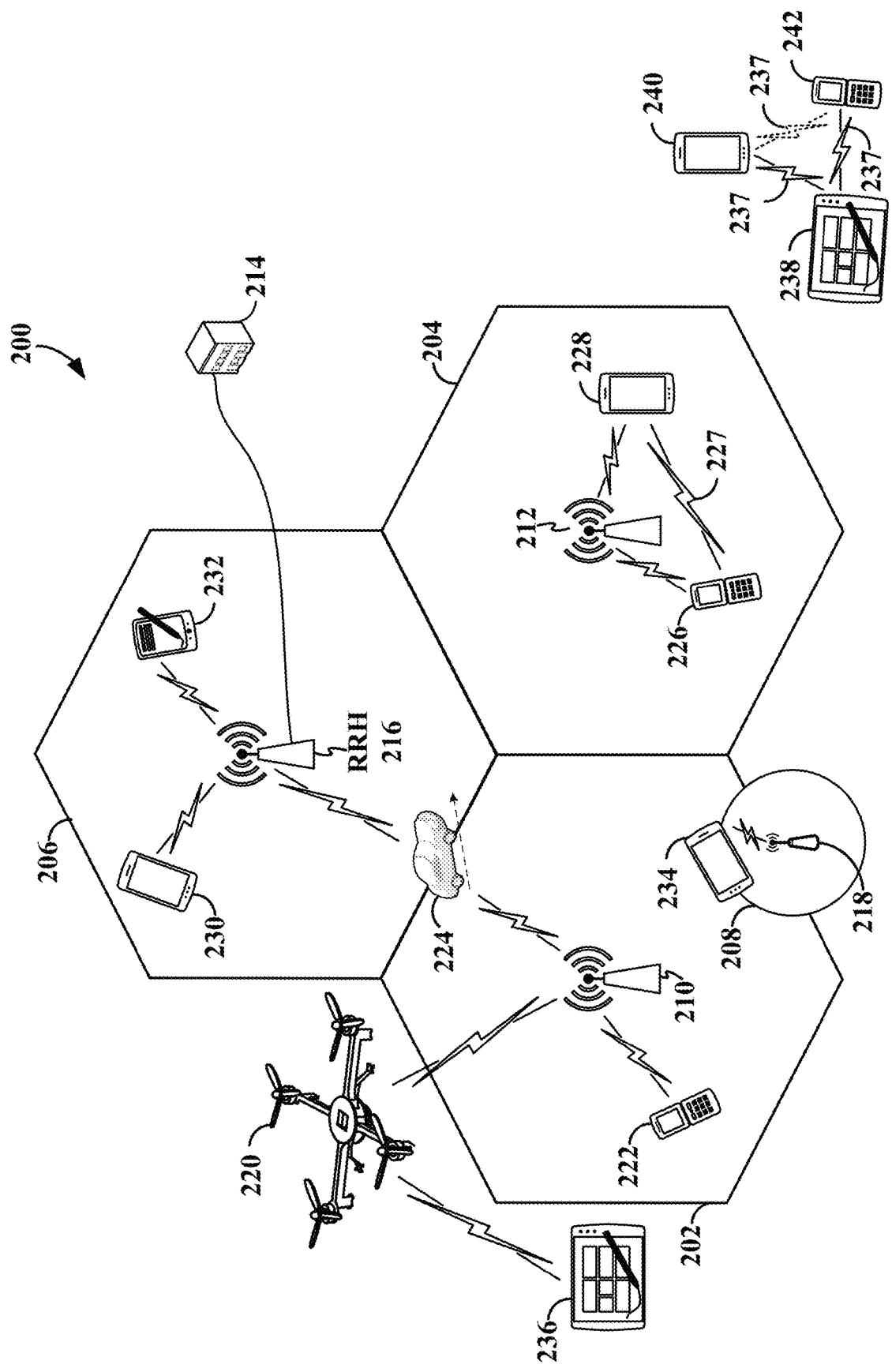
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables or optical fiber. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. It is noted here that, according to some aspects, the RRH 216 maybe a remote radio transceiver that connects to an operator radio control panel. Additionally, the RRH 216 may contain a base station's RF circuitry plus analog-to-digital/digital-to-analog converters and up/down converters. RRHs also may have operation and management processing capabilities and an interface to connect to the rest of the base station. Additionally, a cell, such as cell 206, may include multiple physical cell sites (e.g., multiple RRHs).

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell.

Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (TDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
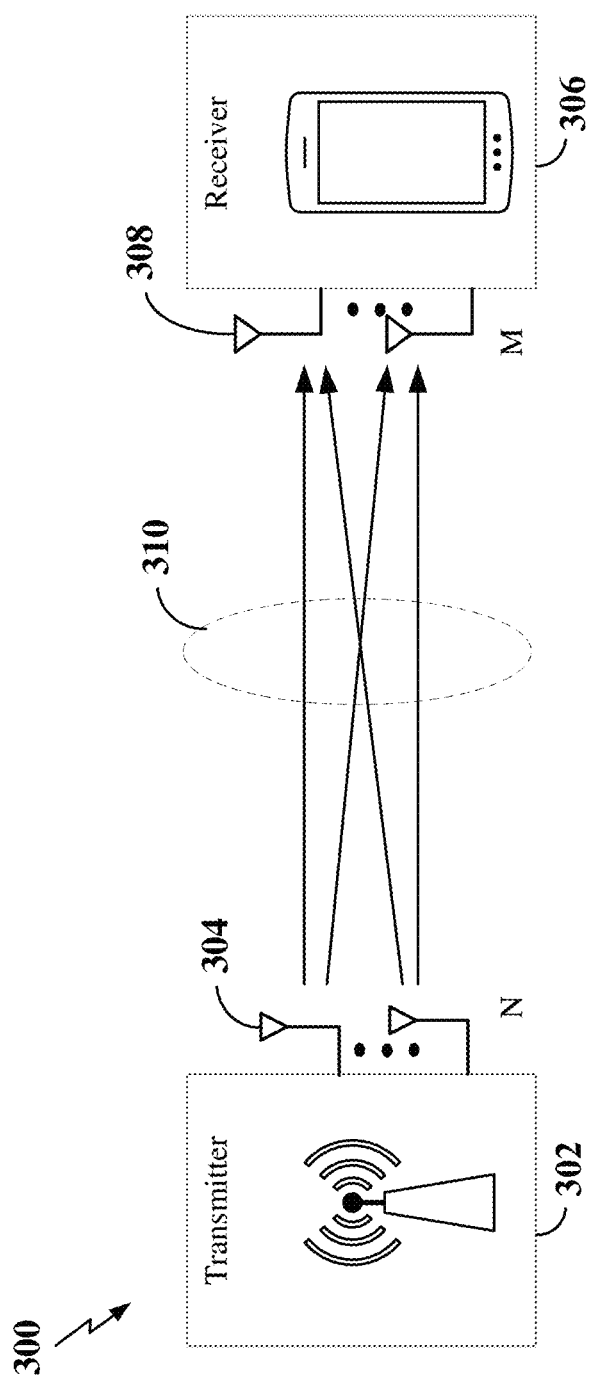
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Figure 4:
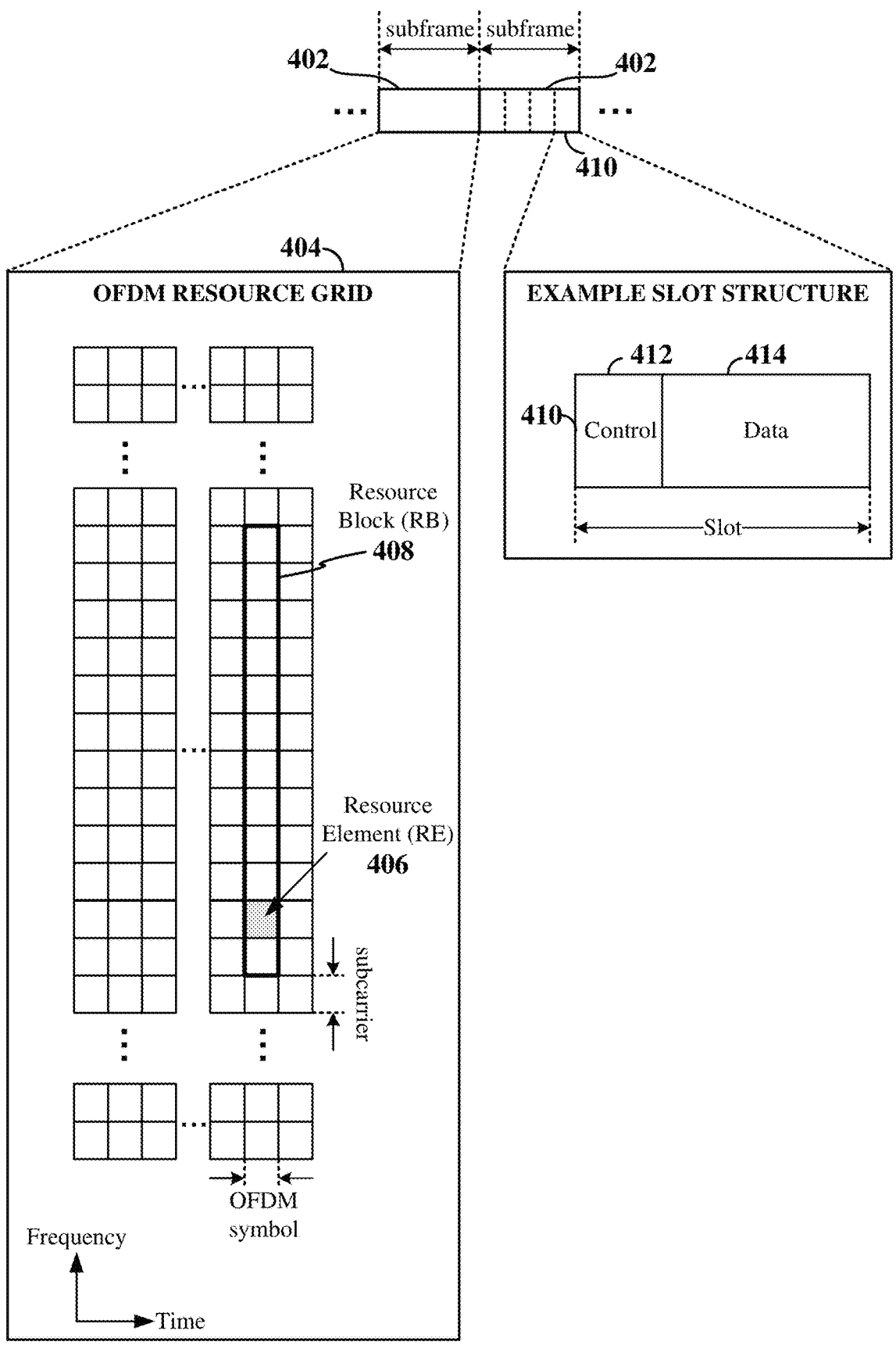
FIG. 4 is a schematic illustration of an organization of wireless resources in an air interface utilizing orthogonal frequency divisional multiplexing (OFDM) according to some embodiments.

Various aspects of the present disclosure utilize an OFDM waveform, an example of which is schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs (e.g., scheduled entities) for downlink or uplink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Concerning multi-beam operation of the apparatus in FIG. 2, for example, enhancements in 5G NR for multi-beam operation have targeted FR2 frequency bands, but are also applicable to the FR1 frequency bands. These enhancements have been provided to facilitate more efficient (i.e., lower latency and overhead) DL/UL beam management to support higher intra-cell and L1/L2-centric inter-cell mobility and a larger number of configured transmission configuration indicator (TCI) states. These enhancements may be effected by providing a common beam for data and control transmission/reception for DL and UL, especially for intra-band carrier aggregation (CA). Also, enhancements may be engendered with a unified TCI framework for DL and UL beam indication. Further, enhancements concerning signaling mechanisms for these features can improve latency and efficiency through greater usage of dynamic control signaling as opposed to RRC signaling Enhancements for multi-beam operation may be based on identifying and specifying features to facilitate UL beam selection for UEs equipped with multiple panels, taking into consideration UL coverage loss mitigation due to maximum permissible exposure (MPE) limitations, and based on UL beam indication with the unified TCI framework for UL fast panel selection.

Other enhancements may be for supporting multi-transmission/reception point (multi-TRP) deployment, including targeting both FR1 and FR2 frequency bands. In particular, enhancements may focus on identifying and specifying features to improve reliability and robustness for channels other than PDSCH (i.e., PDCCH, PUSCH, and PUCCH) using multi-TRP or multi-panel with 3GPP Release 16 reliability features as the baseline. Additionally, enhancements may concern identifying and specifying Quasi-Colocation/Transmission Configuration Indicator (QCL/TCI) related enhancements to enable inter-cell multi-TRP operations, assuming multi-DCI based multi-PDSCH reception. Further, beam-management-related enhancements for simultaneous multi-TRP transmission with multi-panel reception may be provided. Still further concerning multi-TRP deployments, enhancements to support high speed train-single frequency network (HST-SFN) deployment scenarios may be provided, such as identifying and specifying solution(s) on QCL assumptions for DMRS (e.g., multiple QCL assumptions for the same DMRS port(s), targeting DL-only transmissions, or specifying QCL/QCL-like relations (including applicable type(s) and the associated requirement) between DL and UL signals by reusing the unified TCI framework.

Figure 5:
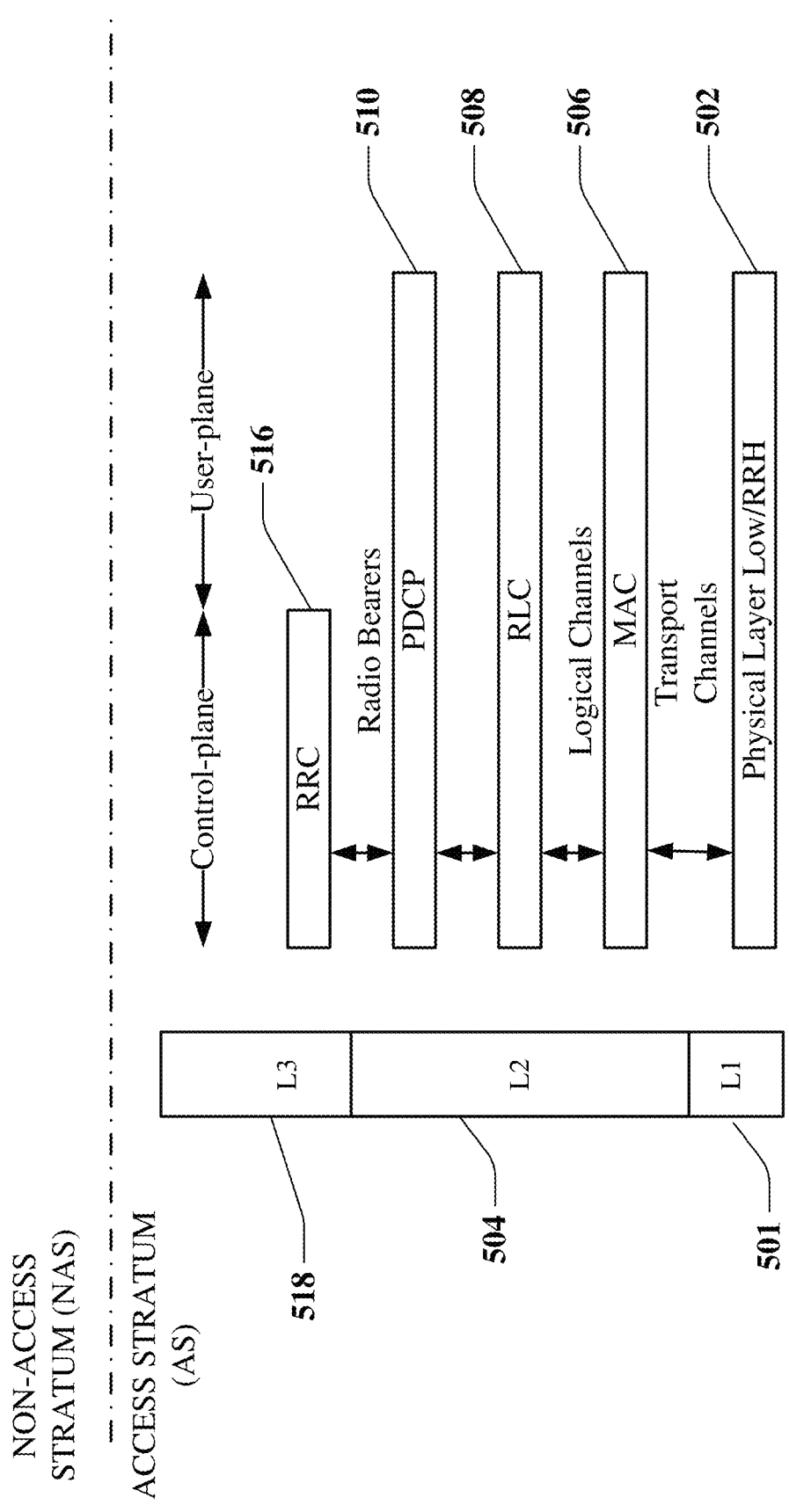
FIG. 5 illustrates a radio protocol architecture for a UE and/or gNB in which the disclosed aspects are operable.

It is further noted that according to certain aspects, the methodology disclosed herein may be implemented at the layer 1 (L1) and layer 2 (L2) levels. Turning to FIG. 5, a generalized radio protocol architecture for a gNB or a UE, but not limited to such, is shown with three layers: Layer 1, Layer 2, and Layer 3. Layer 1 501 is the lowest layer and implements various physical layer signal processing functions, as well as the remote radio head (RRH) in the case of gNBs. Layer 1 will be referred to herein as the physical layer 502 or PHY layer. Layer 2 (L2 layer) 504 is above the physical layer 501 and is responsible for the link between a UE and a gNB over the physical layer 501.

In the user and control planes, the L2 layer 504 includes a media access control (MAC) sublayer 506, a radio link control (RLC) sublayer 508, and a packet data convergence protocol (PDCP) 510 sublayer, which are terminated at the eNB on the network side. Although not shown, a gNB or a UE may have several upper layers above the Layer 2 504 including a network layer (e.g., IP layer) on the network side, and an application layer that is terminated at the other end of the connection (e.g., far end UE, server, etc.).

The PDCP sublayer 510 provides multiplexing between different radio bearers and logical channels. The PDCP sublayer 510 also provides header compression for upper layer data packets to reduce radio transmission overhead, security by ciphering the data packets, and handover support for UEs between eNBs. The RLC sublayer 508 provides segmentation and reassembly of upper layer data packets, retransmission of lost data packets, and reordering of data packets to compensate for out-of-order reception due to hybrid automatic repeat request (HARQ). The MAC sublayer 506 provides multiplexing between logical and transport channels. The MAC sublayer 506 is also responsible for allocating the various radio resources (e.g., resource blocks) in one cell among the UEs. The MAC sublayer 506 is also responsible for HARQ operations.

In the control plane, the radio protocol architecture for the UE and gNB may be substantially the same for the physical L1 layer 501 and the L2 layer 504 with the exception that there is no header compression function for the control plane. The control plane may also include a radio resource control (RRC) sublayer 516 in Layer 3 518. The RRC sublayer 516 is responsible for obtaining radio resources (i.e., radio bearers) and for configuring the lower layers using RRC signaling between the gNB and the UE.

As mentioned above, certain enhancements in 5G NR for multi-beam or multi-TRP operations may include L1/L2-centric inter-cell mobility, which may be a MIMO enhancement feature. Thus, the control for effecting UE mobility between cells (e.g., handoffs) is accomplished through controls and/or signaling in the L1 and/or L2 layers rather than at higher layers above the L2 layer; hence being L1/L2 "centric." According to aspects herein, operational modes or characteristics of this L1/L2-centric inter-cell mobility are disclosed. Broadly, aspects of the present disclosure relate to operation of inter-cell mobility where at least one serving cell in a communication system is configured with one or more physical cell IDs (PCIs) according to a particular selected mode of operation through the use of either signaling or settings for the physical (PHY) layer or the media access control (MAC) layer. Further, based on the mode of operation, a remote radio head (RRH) will serve at least one user equipment (UE) based on power information received from at least one UE (e.g., reference signal receive power (RSRP) information, which is a linear average over the power contributions of resource elements (REs) that carry cell-specific reference signals within a considered measurement frequency bandwidth).

In one particular operational aspect, each serving cell may be configured to have one PCI, but can have multiple physical cell sites, such as a site corresponding to a base station, and/or one or more remote radio heads (RRHs). Each RRH may transmit a different set of SSB IDs but with a same, single PCI for the serving cell. According to a couple of examples, the selection may be accomplished through Layer 1 (L1) signaling using downlink control information (DCI) in the L1 PHY layer or MAC-CE in the L2 MAC layer. In particular, DCI or MAC-CE is used to effect selection of which RRH(s) or corresponding SSBs will serve a UE based on the RSRP per each reported SSB ID. It is noted here that a MAC-CE, which is a media access control-control element, is a MAC structure used for carrying MAC layer control information between a gNB and a UE, for example. The MAC-CE structure may be implemented as a special bit string in a logical channel ID (LCID) field of a MAC Header according to some aspects.

In another aspect, rather than only one PCI, each serving cell can be configured with multiple PCIs. Here, each RRH of the serving cell can use one PCI configured for the corresponding serving cell and may transmit a full set of SSB IDs. Selection of which RRH(s) or corresponding PCI(s) and/or SSB(s) serve the UE may be accomplished by DCI/MAC-CE and also based on an RSRP per reported SSB ID per reported PCI.

In still another aspect, each serving cell may have one PCI, but the DCI/MAC-CE can select which serving cell(s) or corresponding serving cell ID(s) will serve the UE based on the RSRP per reported SSB ID per reported PCI.

The different operational options above are not necessarily limited to SSB IDs, but rather may be applied generally to any cell-defining RS, such as CSI-RS or positioning reference signals (PRS), as examples. According to other aspects, it is noted that for the different operational options, DCI/MAC-CE based cell selection may be applied to only certain cell types. For example, applicable cell types may include any combination of a primary cell (PCell), secondary cells (SCells) and a primary secondary cell (PSCell), which is a primary cell of a secondary cell group. In certain aspects, the DCI/MAC-CE may be configured to only select or deselect SCells or PSCells for the UE, but not the PCell as this is the primary cell.

Figure 6:
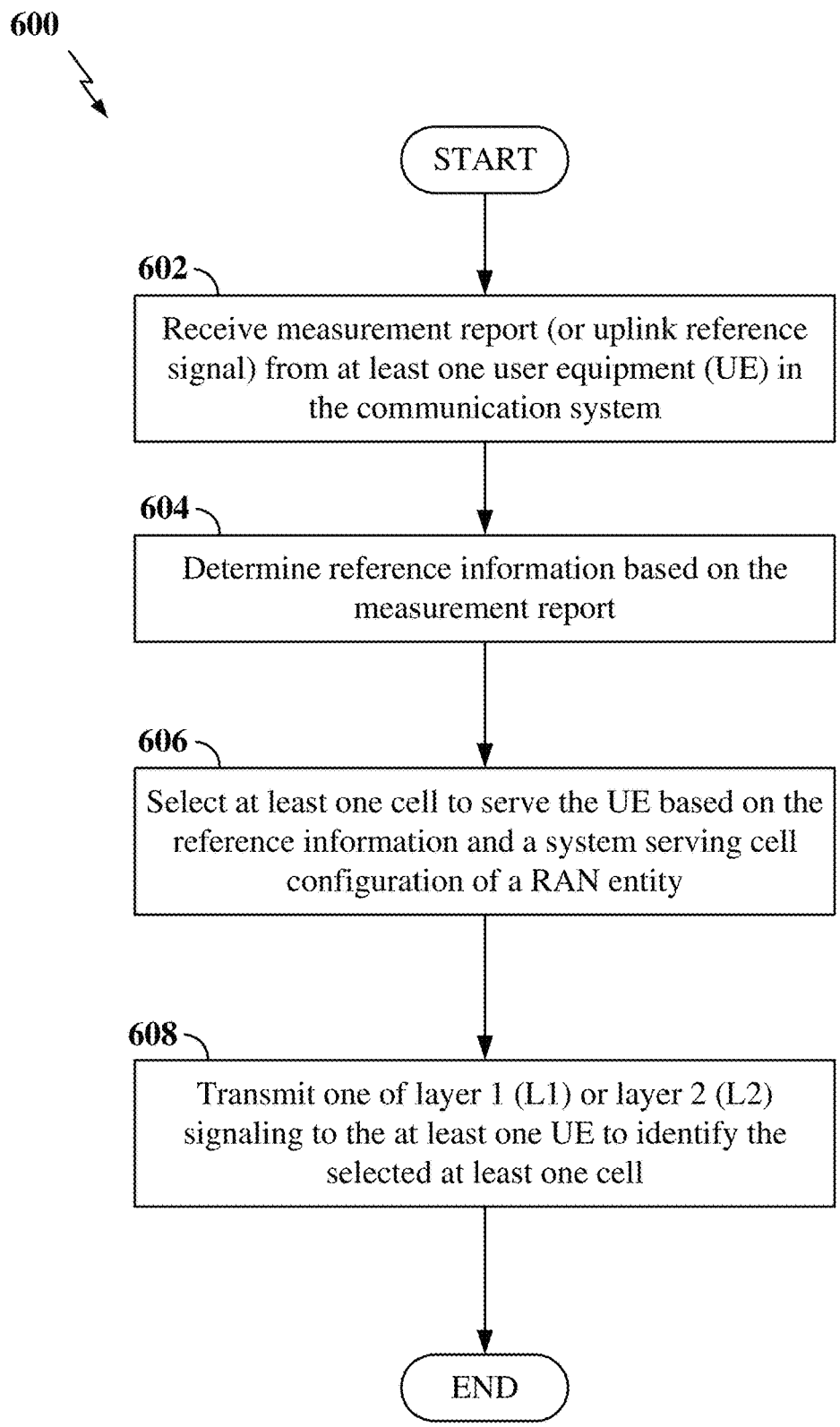
FIG. 6 is a flow chart illustrating a method for selecting resources or cells that will serve a UE in an inter-cell mobility communication system in accordance with some aspects.

FIG. 6 illustrates a flow chart of an exemplary method 600 for selecting resources or cells that will serve a UE in an inter-cell mobility communication system in accordance with some aspects. As described below, some or all illustrated features may be omitted in a particular implementation within the scope of the present disclosure, and some illustrated features may not be required for implementation of all embodiments. In some examples, the method 600 may be carried out by a RAN entity 700 illustrated in FIG. 7, which will be discussed below, or by the RAN entity 700 in conjunction with a UE 800 as illustrated in FIG. 8, which will also be discussed further below. In other examples, the method 600 may be carried out by any suitable apparatus or means for carrying out the functions or algorithm described below.

At block 602, method 600 includes receiving reference signal information, a measurement, or measurement report (collectively referred to as a "measurement report" for brevity, but not limited thereto) from at least one user equipment (UE) via a communication system, such as system 100 in FIG. 1 or system 200 in FIG. 2. In an aspect, the measurement report may be conveyed to the RAN entity through any of various signaling on the UL from the UE, and may be transmitted within the PUCCH or the PUSCH in certain aspects. Furthermore, the measurement report may include a reference signal receive power (RSRP) measurement, but is not limited to such and could alternatively be an SINR measurement, RSRQ measurement, or some other power or channel quality measurement.

Method 600 may further include determining reference information in the RAN entity based on the received measurement report as shown in block 604. In an example, the measurement information may include RSRP, SINR, or RSRQ measurements, or some other power or channel quality measurement per each synchronization signal block (SSB) ID or PCI reported by the at least one UE. The reference information is then determined based on this received information, and may be either the same measurement information (i.e., without further processing or formatting), or processed into some other form or format based on the measurement report.

Additionally, method 600 may include selecting at least one cell to serve the at least one UE based on the reference information and a serving cell configuration of the RAN entity as shown in block 606. In an aspect, the at least one cell may be a cell site, a serving cell, or a cell assigned with a physical cell ID (PCI). In another aspect, the processes of block 606 effect an inter-cell mobility operation where an indication is made to a UE to switch or handover to a selected physical cell site, serving cell, or PCI as directed by the RAN entity, but is not limited to such and determination of switching or handover may also be made, in part or in whole, by the UE.

In some examples, the serving cell configuration of the RAN entity may include one of the operational modes discussed above. In particular, the serving cell configuration may include each serving cell in the communication system having one PCI and a plurality of physical cell sites associated or assigned with the one PCI, where each physical cell site is configured to transmit a different set of cell-defining reference signals. Additionally, L1 or L2 layer signaling may be configured to select a physical cell site to serve the UE based on the reference information.

In another example, the serving cell configuration may include each serving cell in the communication system having a plurality of PCIs and an associated plurality of physical cell sites, where each physical cell site is configured to utilize a PCI of the plurality of PCIs and is configured to transmit a full set of cell-defining reference signals. In this example, L1 or L2 layer signaling may also be configured to select a physical cell site to serve the UE based on the uplink reference signal for each PCI reported via the uplink reference signal or measurement report. In still another example, the serving cell configuration may include each serving cell in the communication system having one PCI, where the L1 or L2 layer signaling is configured to select a serving cell of the one or more serving cells or a serving cell ID corresponding to the selected serving cell based on the uplink reference signal for each PCI reported by the uplink reference signal.

Further, method 600 includes transmitting one of layer 1 (L1) or layer 2 (L2) control signaling to the at least one UE to identify the selected at least one cell as shown in block 608. In certain aspects, the L1 signaling may include DCI and the L2 signaling may include MAC-CE.

According to further aspects, it is noted that the system serving cell configuration in the processes of block 606 may include each serving cell configured to have one PCI and a plurality of remote radio heads (RRHs), where each RRH is configured to transmit a different set of reference signal IDs but with a same PCI for each serving cell. In this case, the selection process of block 606 may then include selecting which of at least one RRH or a corresponding SSB will serve the at least one UE. Moreover, the reference signal IDs may include at least one of a synchronization signal block (SSB), a channel state information reference signal (CSI-RS), or a positioning reference signal (PRS).

According to still other aspects, the system serving cell configuration in block 606 may instead include each serving cell configured to have multiple PCIs configured for each serving cell and to be able to transmit a full set of reference signal IDs. Here, the selection using the L1 or L2 controls may then include selecting which at least one RRH or a corresponding PCI or SSB will serve the at least one UE. In yet another aspect, the system serving cell configuration in block 606 may include each serving cell configured to have one PCI configured for each serving cell and the ability to transmit a full set of reference signal IDs. In this scenario, the selection using the L1 or L2 signaling may be configured to communicate which serving cell or corresponding serving cell ID will serve the at least one UE.

Method 600 may also include that the selection process in block 606 are selectively applied to certain cells types. In particular, the selection using the L1 or L2 signaling (e.g., DCI/MAC-CE) may be only applied (i.e., selection or deselection) to certain cell types of serving cells including one or more of a secondary cell (SCell), a primary cell (PCell), and a primary secondary cell (PSCell). In a further aspect, the selection or deselection of serving cells may be constrained such that a PCell may not be deselected.

In yet a further aspect, since the selection being made in method 600 is in the environment of an inter-cell mobility system, the method 600 may further include the UE switching from a current serving cell to the selected remote radio head (RRH), the at least one serving cell, or the physical cell ID (PCI) after selection and transmission in block 606 and 608. It is noted that the switching may be in the context of an inter-cell mobility handoff from the current cell to one or more of the selected cells, RRHs, or PCIs. Furthermore, it is noted that the processes of blocks 602-608 may implemented in the RAN entity as mentioned above, which may include a scheduling entity such as base station 108 in FIG. 1, a gNB, or the RAN entity 700 in FIG. 7. Moreover, the particular selection made in block 606 may be communicated from the RAN entity to one or more UEs via DL channels such as PDCCH or PDSCH, as examples.

Figure 7:
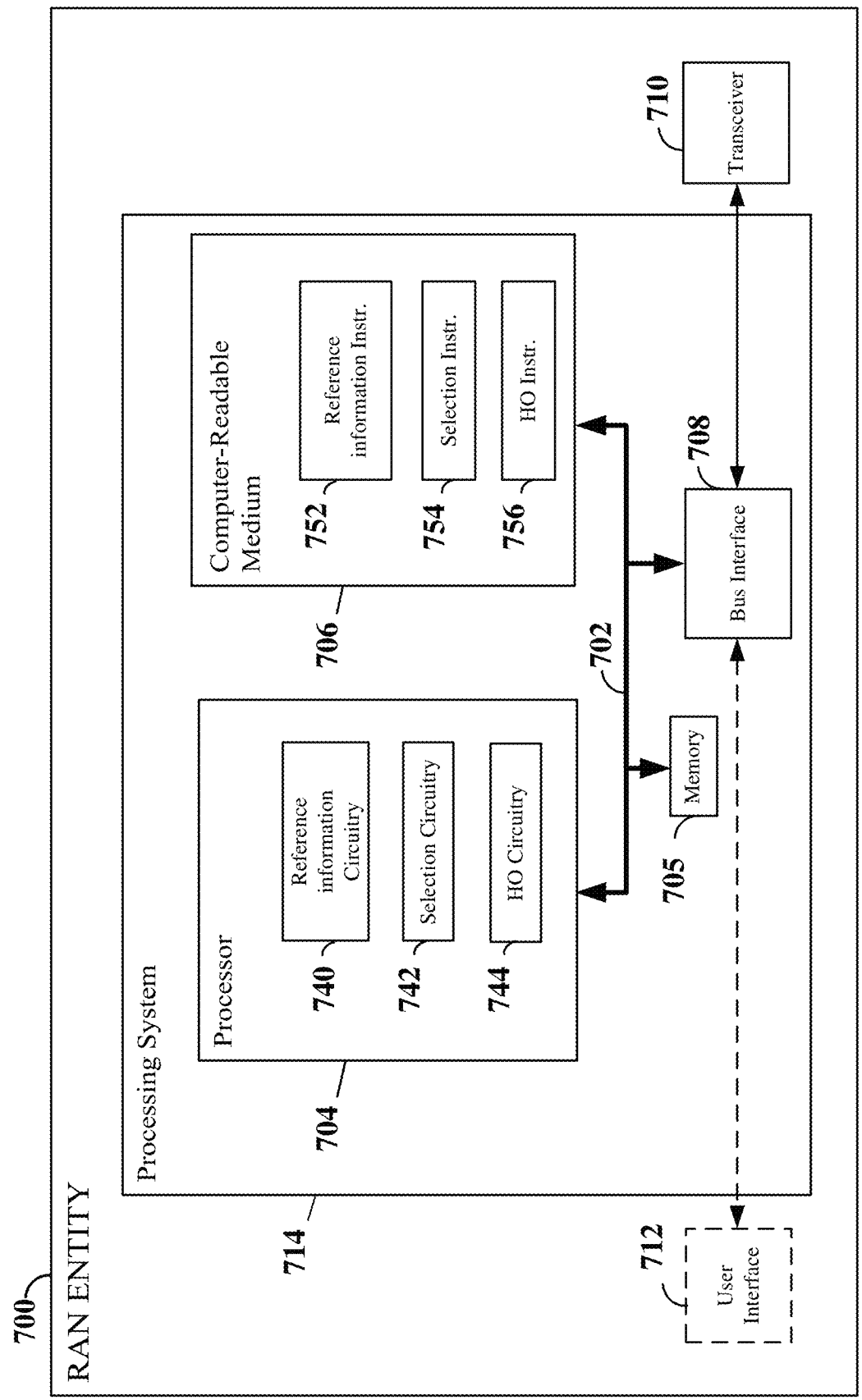
FIG. 7 is a block diagram illustrating an example of a hardware implementation for a radio access network (RAN) entity employing a processing system according to some aspects.
Figure 8:
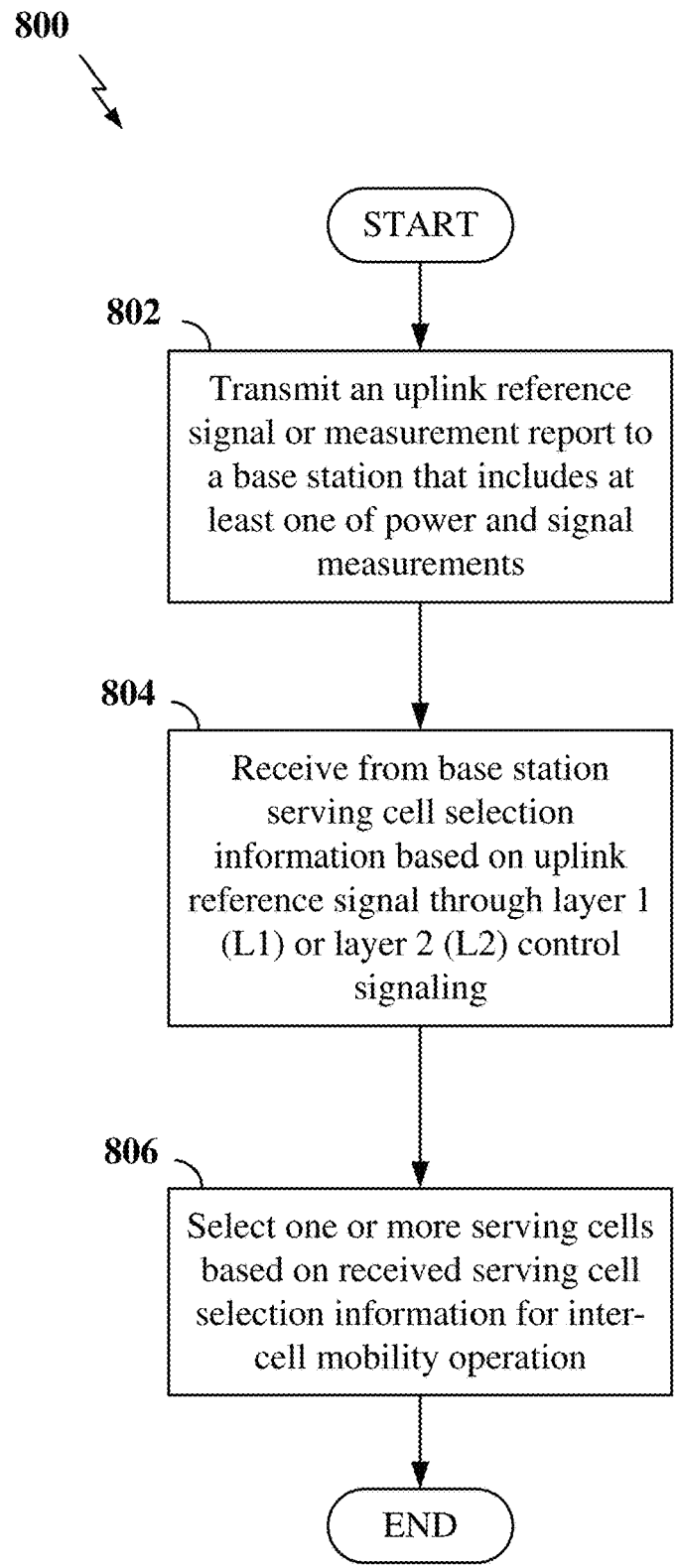
FIG. 8 illustrates a method for selecting cells in a UE in an inter-cell mobility communication system according to some aspects.

FIG. 7 is a block diagram illustrating an example of a hardware implementation for a RAN entity 700 employing a processing system 714. For example, the RAN entity 700 may be a base station, gNB, or scheduling entity as illustrated in any one or more of FIG. 1, 2, or 3. In another example, the RAN entity 700 may be a UE acting as scheduling entity as illustrated in any one or more of FIG. 1, 2, or 3.

The RAN entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN entity 700 may be configured to perform any one or more of the functions described herein. That is, the processor 704, as utilized in RAN entity 700, may be used to implement any one or more of the processes and procedures described above and illustrated in method 600 disclosed in FIG. 6. as well as the methods of FIGS. 10 and 13, to be discussed later.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium (e.g., an air interface). Depending upon the nature of the apparatus, a user interface 712 (e.g., keypad, display, speaker, microphone, joystick) may also be provided. Of course, such a user interface 712 is optional, and may be omitted in some examples, such as for a gNB or a base station.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include reference information circuitry 740, which is configured to receive the measurement information from a UE (e.g., measurement report, measurements, etc.) in a communication system where the reception of the information may also be in cooperation with transceiver 710, as well as determine the reference information based on the received measurement information through further processing of the information in some examples, but not necessarily limited to such. In an aspect, the measurement information may be received through PUCCH or PUSCH transmissions. Furthermore, this measurement information may be received in the form of reference signaling from the UE, and may include reference signal receive power (RSRP) measurements, SINR measurements, RSRQ measurements, or other power or channel quality measurements. In some examples, the reference information circuitry 740 may be configured to may further be configured to execute reference information instructions 752 (e.g., software) stored in the computer-readable medium 706 to implement one or more of the functions described herein.

In further aspects, the processor 704 may include selection circuitry 742 that, among other things, effects the selection of either an RRH, PCI, or at least one serving cell for serving a UE in an L1/L2-centric inter-cell mobility system, such as was discussed before in connection with block 606 in FIG. 6.

Additionally, it is noted that the selection circuitry 742 may be configured to operate according to various configurations, including the serving cell configuration of the RAN entity comprising a single PCI of one or more PCIs, the single PCI corresponding to a plurality of cell sites. This may further include the function of transmitting a different set of reference signal IDs for each of the plurality of cell sites, and may involve the cooperation of transceiver 710. The reference signal IDs may each include at least one of a synchronization signal block (SSB), a channel state information reference signal (CSI-RS), or a positioning reference signal (PRS).

In another aspect, the selection circuitry 742 may be configured to operate according to a serving cell configuration of the RAN entity where each serving cell is configured to have a plurality of PCIs configured for each serving cell in the communication system and configured to transmit a full set of reference signal IDs. In this aspect, the selection circuitry 742 may further effectuate identifying through transmitting the L1 or L2 signaling at least one physical cell site or a corresponding PCI or reference signal (RS) that serves the at least one UE. Further the serving cell configuration of the RAN entity may include a plurality of cell sites including the at least one cell site, and a plurality of PCIs including the one or more PCIs, each PCI of the plurality of PCIs corresponding to a different cell site of the plurality of cell sites. In this aspect, the selection circuitry 742 may be configured to cause transmission of a plurality of reference signal IDs from each of the plurality of cell sites, where each reference signal ID of the plurality of reference signal IDs corresponds to a respective one of the plurality of cell sites.

In yet another aspect, the selection circuitry 742 may be configured to operate according to a serving cell configuration of the RAN entity where the serving cell configuration of the RAN entity comprises a single PCI from one or more PCIs. In this case, the selection circuitry 742 may effect transmission of a serving cell ID signal for the selected at least one cell site.

In still one further aspect, the selection circuitry 742 may be configured to cause configuration of the cell site having a plurality of remote radio heads (RRHs) or using a plurality of cells with associated PCIs to transmit a set of synchronization signal block (SSB) IDs (SSB IDs) as will be discussed in more detail with reference to FIGS. 10 and 11, which will be discussed later. In this case, the selection circuitry 742 may be configured to select a respective frequency location for each RRH in the plurality of RRHs or cell associated with a PCI in the plurality of PCIs in which to transmit the corresponding set of SSBs IDs for serving the at least one UE. Additionally, the circuitry 742 may cause transmitting each respective frequency location for each RRH or PCI in the plurality of RRHs or PCIs to the at least one UE with one of the L1 or L2 signaling in cooperation with transceiver 710. In some examples, the selection circuitry 742 may be configured to may further be configured to execute selection instructions 754 (e.g., software) stored in the computer-readable medium 706 to implement one or more of the functions described herein.

According to another aspect, the processor 704 may include handoff or handover (HO) circuitry 744 configured for performing handover processes, such as those that will be described later in connection with FIGS. 12-14. In an example, the HO circuitry 744 may be configured to configure a handover (HO) command for the at least one UE that is being served by a source cell to handover to a target cell. The HO circuitry 744 may be configured to configure the HO command to include a cell match indication that indicates whether a target cell configuration of the target cell is the same as a source cell configuration of the source cell. Further, the HO circuitry 744 may be configured to transmit the HO command to the at least one UE for handover of the at least one UE to the target cell, wherein the HO command is one of the L1 or L2 signaling. In some examples, the HO circuitry 744 may be configured to may further be configured to execute HO instructions 756 (e.g., software) stored in the computer-readable medium 706 to implement one or more of the functions described herein.

Figure 10:
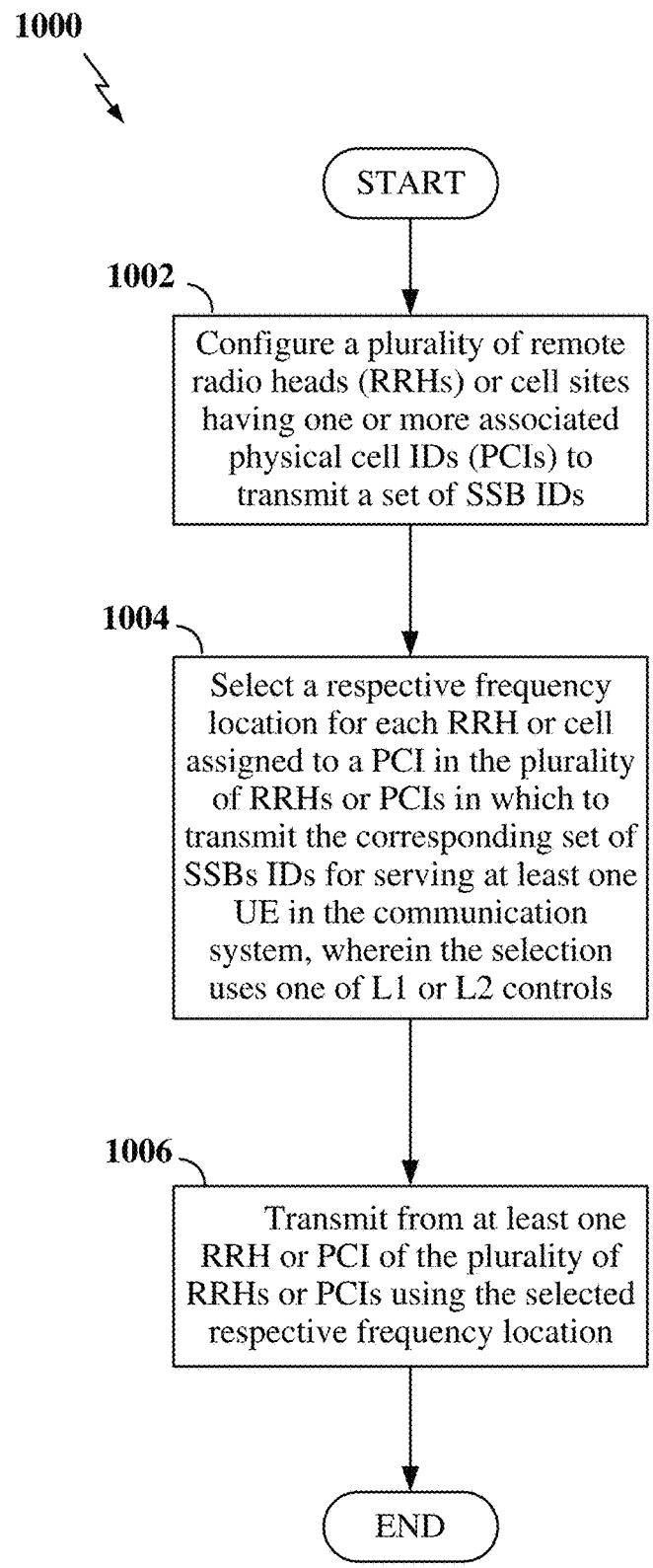
FIG. 10 is a flow chart illustrating a method for selecting resources in a RAN entity that will serve a UE in an inter-cell mobility communication system according to some aspects.

In one configuration, the RAN entity 700 includes means for performing the various functions and processes described in relation to FIGS. 6, 10, and/or 13. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1-3, and utilizing, for example, the processes and/or algorithms described herein in relation to FIGS. 6, 10, and/or 13.

FIG. 8 illustrates yet another method 800 for selecting cells in a UE that will serve the UE in an inter-cell mobility communication system in accordance with some aspects of the present disclosure. Method 800 includes transmitting an uplink reference signal to a RAN entity that includes at least one of power or signal measurements as shown in block 802. Furthermore, method 800 includes receiving one of layer 1 (L1) or layer 2 (L2) signaling from the base station that identifies one or more selected serving cells that serve the UE based on the transmitted uplink reference signal as shown in block 804. Additionally, method 800 includes selecting one or more serving cells during inter-cell mobility operations based on the received L1 or L2 layer signaling as shown at block 806.

According to yet another aspect, method 800 may include further aspects including utilizing a different SSB frequency location for each RRH or physical cell site. In this method, each serving cell may have multiple RRHs, wherein each RRH may transmit the full set of SSB IDs, but at a different SSB frequency location for each respective RRH. Similar to the methodologies discussed above, layer 1 (L1) and/or layer 2 (L2) signaling may be utilized to select the SSB frequency locations. In further aspects, it is noted that the SSB frequency locations may be selected to be on the SSB raster. It is noted that the SSB Raster is the synchronization signal block raster, which is a predefined set of frequency carrier assignments that are used for transmission of synchronization signal blocks. The frequency location selections are made to adhere to the frequency locations or bands on the SSB frequency raster (e.g., at set center frequencies of 17 MHz, 34 MHz, 51 MHz, etc.). In other aspects, the SSB frequency location may be a combination or mix of frequency locations where some frequency locations are on the raster while others are not. In yet further aspects, the SSB frequency locations could be restricted such that only frequency locations that are not on the SSB raster (non-raster locations) are selected, thereby avoiding selection of raster frequencies.

In particular aspects, DCI (e.g., L1 controls or signaling) or MAC-CE (i.e., L2 controls or signaling) may be configured to select which SSB frequency locations that are assigned to respective RRHs serving a UE. In a particular aspect, indexes may be used to reference the selected SSB frequency locations and these indexes indicated in the DCI or MAC-CE controls. It is noted that the processes of selecting the frequency locations may be performed after a UE finishes initial access processes via at least one RRH of the serving cell. In this case, the serving cell may be configured to send or indicate the SSB frequency locations and corresponding indexes to the UE only after the UE completes initial access.

According to still other aspects, in order to facilitate UE initial access in the scheme of selecting SSB frequency locations, a communication system may be configured such that at least one RRH of the serving cell will transmit SSBs on the SSB raster in addition to any SSB transmissions off of the SSB raster in the case where both raster and non-raster locations are utilized. This may be done according to at least two options.

In a first option for the initialization scenario, at UE initialization one RRH (or a cell assigned with at least one PCI) may be configured to transmit the full set of SSB IDs at a frequency location on the SSB raster. In a second option for the initialization scenario, multiple RRHs (or PCIs) may be configured to transmit the full set of SSB IDs on the SSB raster, where each RRH (or the cell assigned with the at least one PCI) only transmits a subset of the full set of SSB IDs. It is noted here that these option are temporal or temporary during UE initialization in order to better ensure initialization is performed quickly and optimally. That is, in normal operation each RRH is configured to transmit the full set of SSB IDs, but at a different SSB frequency locations, whereas during initialization the selection of frequency locations for the set SSB IDs is kept to transmission within the SSB raster, either from one RRH or dividing the SSB IDs into a plurality of frequency locations that are all on the SSB raster.

Figure 9:
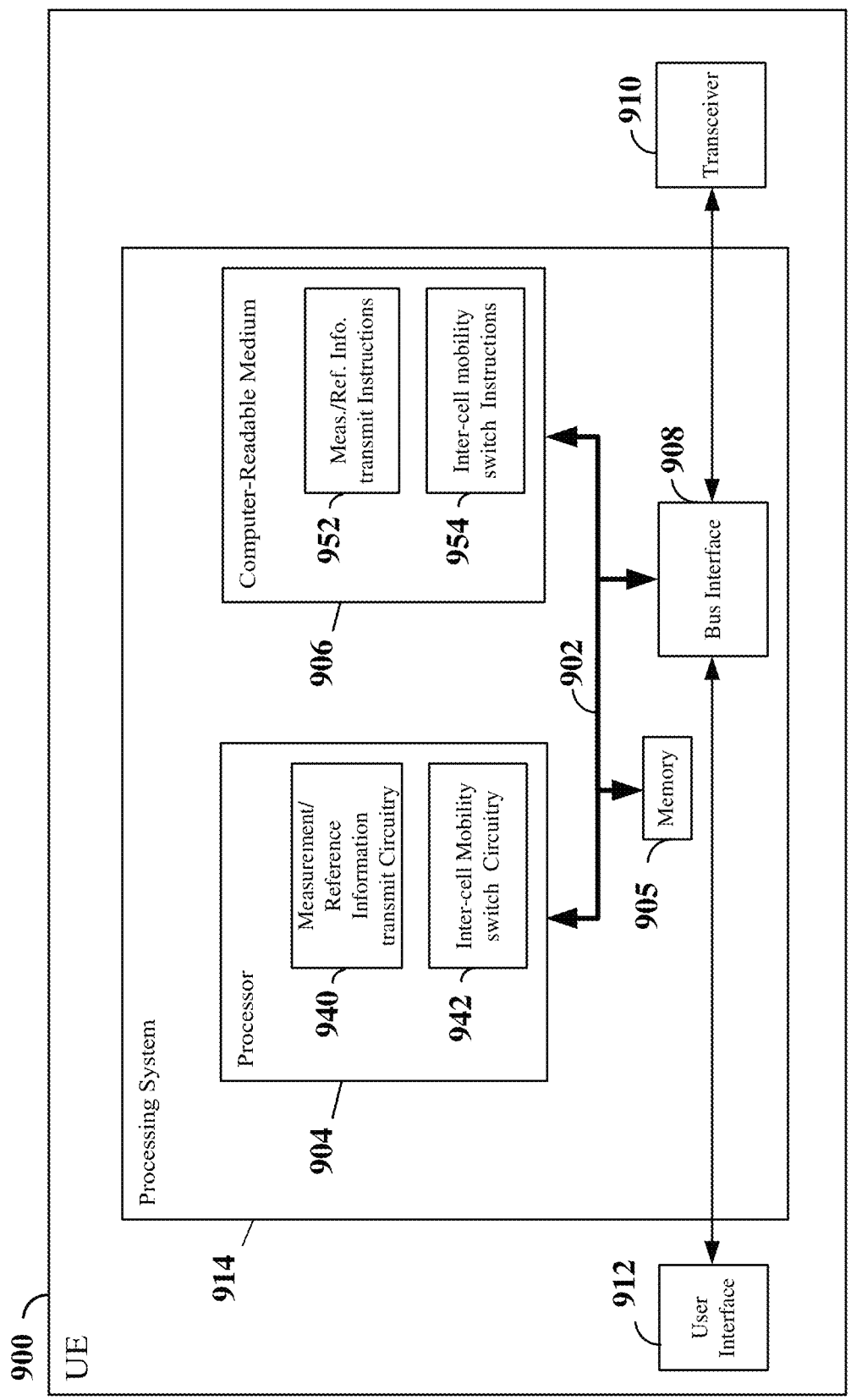
FIG. 9 is a block diagram illustrating an example of a hardware implementation for a UE employing a processing system according to some aspects.

In yet other aspects, it is noted that an RRH or gNB may select the frequency locations based on qualitative measurements received in an uplink measurement report. The measurement report may include one or more of a reference signal receive power (RSRP) measurement signal, a signal-to-interference-and-noise ratio (SINR) measurement signal, or a reference signal received quality (RSRQ) measurement signal. Still further, the RRH or gNB may be configured to select the frequency locations FIG. 9 is a diagram illustrating an example of a hardware implementation for an exemplary UE 900 employing a processing system 914. In accordance with various aspects of the disclosure, an element, or any portion of an element, or any combination of elements may be implemented with a processing system 914 that includes one or more processors 904. For example, the UE 900 may be a user equipment (UE) as illustrated in any one or more of FIGS. 1, 2, 3, and/or 12.

The processing system 914 may be substantially the same as the processing system 714 illustrated in FIG. 7, including a bus interface 908, a bus 902, a memory 905, a processor 904, and a computer-readable medium 906. Furthermore, the UE 900 may include a user interface 912 and a transceiver 910 substantially similar to those described above in FIG. 7. That is, the processor 904, as utilized in a UE 900, may be used to implement one or more of the processes described above in connection with the methodology disclosed in FIG. 8, as well as the methodologies of FIGS. 11 and 14, to be described later.

In some aspects of the disclosure, the processor 904 may include measurement/reference information transmit circuitry 940 configured for various functions, including, for example, transmitting reference information to a RAN entity (e.g., RAN entity 700). For example, the reference information transmit circuitry 940 may be configured to implement a function of determining or obtaining a power measurement such as RSRP and then causing transmission to a RAT entity, gNB, or base station via transceiver 910. In other aspects, the computer-readable storage medium 906 may include reference information transmit instruction software 952 configured for various functions disclosed herein, including, for example, determining or obtaining a power measurement such as RSRP and then causing transmission to a RAN entity, gNB, or base station via transceiver 910.

In other aspects of the disclosure, the processor 904 may also include an inter-cell mobility switch circuitry 942 configured for various functions including causing the UE 900 to switch from a current serving cell to a selected cell based on the selection performed by circuitry 742 shown in FIG. 7 and also shown by block 606 in FIG. 6. In particular, inter-cell mobility switch circuitry 942 may be configured to receive one of layer 1 (L1) or layer 2 (L2) signaling from the RAN entity that identifies one or more selected serving cells to serve the UE based on the transmitted uplink reference signal, and then select one or more serving cells during inter-cell mobility operations based on the received L1 or L2 layer signaling. In one or more examples, the computer-readable storage medium 906 may include inter-cell mobility switch instruction software 954 configured for various functions, including, for example, causing the UE 900 to switch from a current serving cell to a selected cell based on the selection performed by circuitry 740 shown in FIG. 7 and also shown by block 606 in FIG. 6.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 3, and/or 12, and utilizing, for example, the processes and/or algorithms described herein in relation to FIG. 8.

Figure 11:
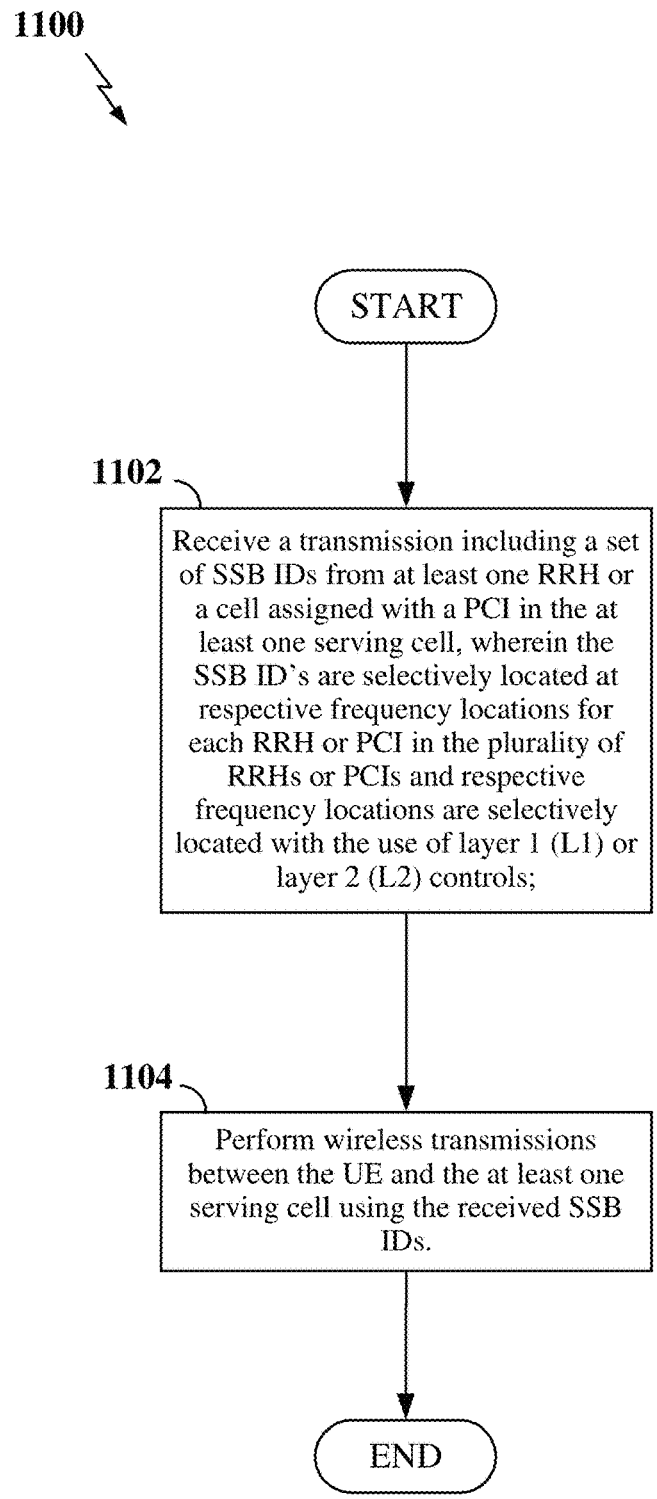
FIG. 11 illustrates a flow chart of still another method for selecting resources within a UE in an inter-cell mobility communication system according to some aspects.

In one configuration, the UE 900 includes means for performing the various functions and processes described in relation to FIGS. 8, 11, and/or 14. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1-3 and/or 12, and utilizing, for example, the processes and/or algorithms described herein in relation to FIGS. 8, 11, and/or 14.

In other configurations, the apparatus 700 and/or 900 for wireless communication includes means for receiving reference information from at least one user equipment (UE) via the communication system and means for selecting at least one of a remote radio head (RRH), at least one serving cell, or a cell associated with a physical cell ID (PCI) that serves the at least one user equipment (UE) using one of layer 1 (L1) or layer 2 (L2) controls based on the received reference information and a serving cell configuration. In one aspect, the aforementioned means may be the processor(s) 704 and/or 904 shown in FIGS. 7 and 9 and configured to perform the functions recited by the aforementioned means.

FIG. 10 shows a flow chart illustrating a method 1000 for selecting resources that will serve a UE in an inter-cell mobility communication system in accordance with some aspects of the present disclosure. In aspects, method 1000 may be implemented in a RAN entity (e.g., base station or gNB), such as is illustrated by RAN entity 700, for example. Method 1000 includes configuring a plurality of remote radio heads (RRHs) or cells having one or more assigned physical cell IDs (PCIs) to transmit a set of synchronization signal block (SSB) IDs (SSB IDs) as shown at block 1002. Further, method 1000 includes selecting a respective frequency location for each RRH or cell associated with a PCI in the plurality of RRHs or cells associated with the PCIs in which to transmit the corresponding set of SSBs IDs for serving at least one user equipment (UE) (e.g., scheduled entity 800 shown in FIG. 8) in the communication system, wherein the selection uses one of layer 1 (L1) or layer 2 (L2) controls as shown at block 1004. Method 1000 also includes transmitting each respective frequency location for each RRH or cell associated with a PCI in the plurality of RRHs or cells associated with PCIs to the at least one UE as shown in block 1006.

In further aspects, method 1000 may include transmitting at least one index via the L1 or L2 controls, wherein the at least one index indicates at least one selected SSB frequency location. Additionally, method 1000 may include selecting the respective frequency location for each RRH or cell assigned or associated with a PCI based on an SSB frequency raster, wherein each respective frequency location is set to one of a plurality of frequency locations on the SSB raster.

In still other aspects, method 1000 may include selecting the respective frequency location for each RRH or cell assigned or associated with a PCI based on an SSB frequency raster, wherein at least one respective frequency locations is set to one of a plurality of frequency locations on the SSB raster and at least one other respective frequency location is set to a frequency location that is off of the SSB raster. In another example, method 1000 may include selecting the respective frequency location for each RRH or cell assigned or associated with a PCI based on an SSB frequency raster, wherein each respective frequency location is set to a frequency location that is off of the SSB raster.

Method 1000 may also include determining whether the at least one UE has completed an initial access with the serving cell. The methodology of transmitting each respective frequency location for each RRH or cell assigned or associated with a PCI in the plurality of RRHs or cells assigned or associated with the PCIs to the at least one UE after the at least one UE may be suspended or modified until the UE has completed the initial access. Furthermore, method 1000 may include transmitting at least one index via the L1 or L2 controls after the at least one UE has completed the initial access, where the at least one index indicates at least one selected SSB frequency location.

Similar to methods described earlier, method 1000 may also determine the selection of the SSB frequency locations based on uplink measurement reports. Thus, method 1000 may include receiving an uplink measurement report from the at least one UE, and then selecting the respective frequency location based, in part, on the received uplink measurement report, as well as other parameters such as whether or not the locations are on or off the raster or if the frequency locations are already allocated. As discussed before, the uplink measurement report may include a reference signal receive power (RSRP) measurement signal, a signal-to-interference-and-noise ratio (SINR) measurement signal, or a reference signal received quality (RSRQ) measurement signal.

Additionally, method 1000 may include a modified or different operation during initialization of the UE with the serving cell. Thus, method 1000 may include transmitting the set of SSB IDs (e.g., the full set of SSB IDs in the SSB frequency raster) with one RRH or cell assigned or associated with a PCI in the plurality of RRHs or cells associated with the PCIs at a frequency location that is on an SSB frequency raster during a period of initial access of the serving cell by the at least one UE. After the initial access period, the method may then change to allowing transmission of the set of SSB IDs using one or more of the plurality of RRHs or cells assigned or associated with the plurality of PCIs after the period of initial access using frequency locations at least one of on or off the SSB frequency raster. In another option, method 1000 may include transmitting only a respective subset of the set of SSB IDs with a corresponding one RRH or cell assigned or associated with a PCI in the plurality of RRHs or cells associated with the PCIs at respective frequency locations that are on an SSB frequency raster during a period of initial access of the serving cell by the at least one UE. According to an aspect, the totality of the respective subsets will, in aggregate, constitute the full set of SSB IDs on the SSB frequency raster. After the initial access period, the processes in the method 1000 may then be changed to allow transmission of the set of SSB IDs using one or more of the plurality of RRHs or cells assigned or associated with the PCIs after the period of initial access using frequency locations at least one of on or off the SSB frequency raster.

FIG. 11 illustrates a flow chart of still another method 1100 for selecting resources in a UE in an inter-cell mobility communication system in accordance with some aspects of the present disclosure. In this method 1100, which may be implemented within a UE such as scheduled entity 800 in FIG. 8, a transmission is received in the UE including a set of synchronization signal block (SSB) IDs (SSB IDs) from at least one remote radio head (RRH) or a cell assigned or associated with a physical cell ID (PCI) in the at least one serving cell, wherein the SSB ID's are selectively located at respective frequency locations for each RRH or cell assigned or associated with a PCI in the plurality of RRHs or cells assigned with a plurality of PCIs and respective frequency locations are selectively located with the use of layer 1 (L1) or layer 2 (L2) controls as shown in block 1102. Furthermore, method 1100 includes performing wireless transmissions between the UE and the at least one serving cell using the received SSB IDs as shown in block 1104.

According to yet another aspect, another method may be employed for a L1/L2-centric inter-cell mobility system where each serving cell has one physical cell ID (PCI) and its own serving cell ID. In particular, for an L1/L2 based handover (e.g., DCI or MAC-CE based handover), such as an PSCell change, for example, a handover (HO) command issued by the source cell may be used to indicate to a UE that a target cell has a configuration that is identical to or matching the source cell (also termed herein as a "cell match indication"). In this case, the UE can reuse the configuration from the source cell when being handed over from the source cell to the target cell, thereby saving resources and achieving improved efficiency. In an aspect, the cell match indication in the HO command may constitute a single bit field where the bit state indicates to the UE whether the target cell configuration matches the source cell or not. For example, a bit value of "1" may indicate a match in cell configuration, whereas a bit value of "0" would indicate a difference in the cell configurations. Additionally, the field in the HO command carrying the cell match indication may be a new field or, alternatively, an existing field that is reused or repurposed for providing the cell matching indication. It is noted here that the methods may be applied to handovers in systems using PCells, PSCells, and/or SCells.

In further aspects, if there is a difference in the cell configuration, the HO command may be further configured to convey the different part or portion of the target cell configuration to the UE. In this case, the UE can reuse those portions of the cell configuration that are shared by the source and target cells, and then use the further conveyed configuration information concerning the target cell configuration provided in the HO command.

According to certain aspects, a serving cell or gNB may be configured to provide, predetermine, or establish a default cell configuration in advance. Additionally, the serving cell or gNB may signal any cell configuration difference from the default cell configuration in L1/L2 based HO or cell change commands.

In still other aspects, it is noted that a difference in cell configurations might include differing physical uplink control channel (PUCCH) resources that might arise due to the difference in the number of served UEs in the cells. Other examples of differences in the cell configuration might include differing PDSCHs arising from differences in the number of served UEs in the respective cells.

Figure 12:
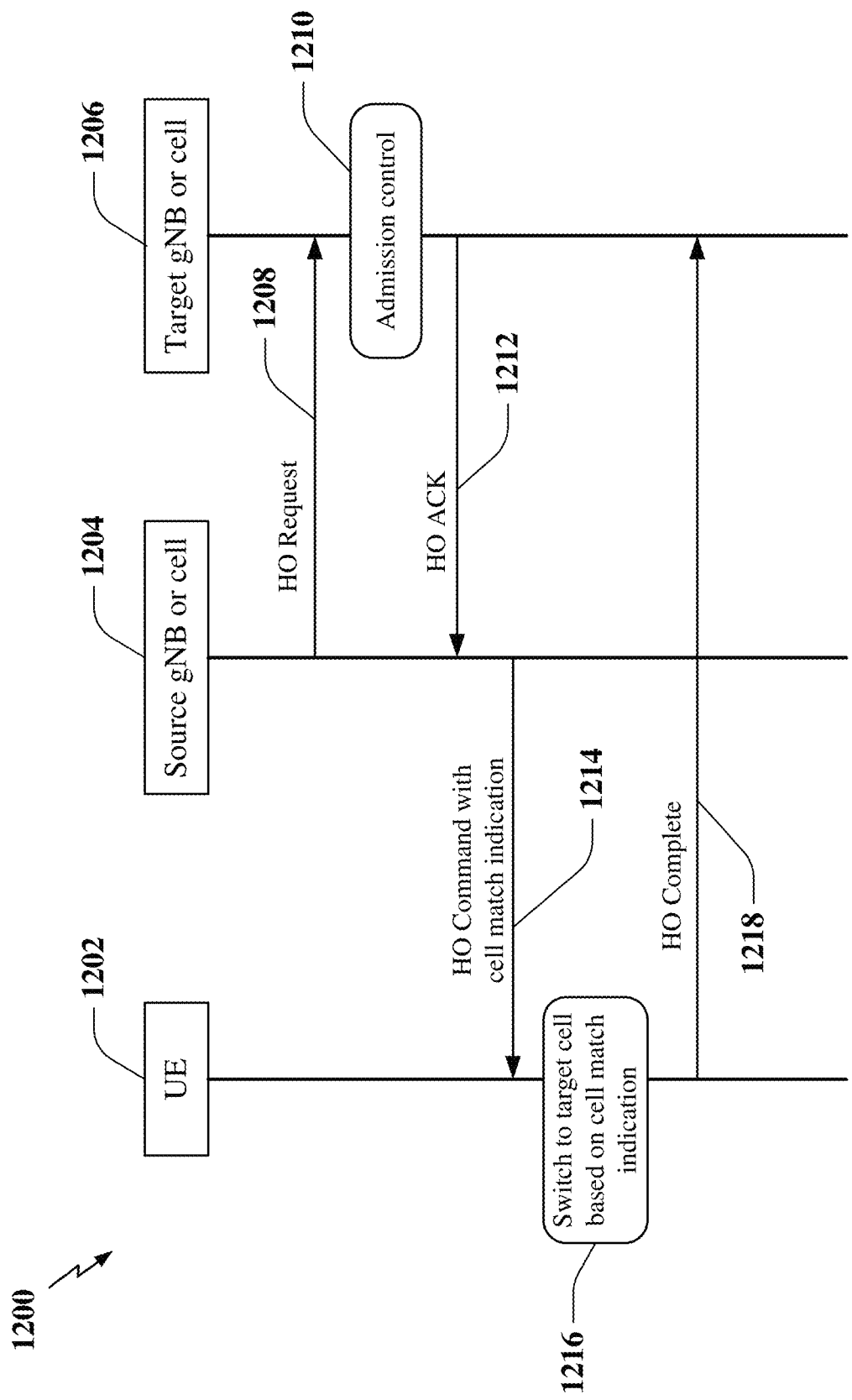
FIG. 12 is an example call flow diagram illustrating handover signaling and processes when a UE is handed over from a serving cell to a target cell according to some aspects.

FIG. 12 illustrates a timing diagram 1200 illustrating handover signaling and processes when a UE is handed over from a serving cell to a target cell. In one aspect, the handover illustrated in diagram 1200 may be an L1/L2 based handover through DCI and/or MAC-CE signaling, for example. As illustrated, the timing diagram 1200 shows the handover of a UE 1202 from a source cell or gNB 1204 to a target cell or gNB 1206. In particular, the timing diagram 1200 illustrates that for the initiation of a UE handover, the source cell 1204 may first send a handover (HO) request 1208 to the target cell 1206. The target cell 1206 then performs admission control processes 1210 to determine if the HO request is to be accepted or granted. If so, the target cell 1206 sends an acknowledgement signal HO ACK 1212 to the source cell 1204.

After the acknowledgement signal 1212 is received from the target cell 1206, the source cell 1204 then issue an HO command signal 1214 to the UE 1202. Of note, the HO command 1214 may be one of L1 or L2 signaling and include the cell match indication within the command 1214, which may be an at least one bit field as discussed above, but is not limited to such if more information is desired to be communication beyond merely a binary difference or no difference indication. It is noted that in the case where the source and target cells have a different cell configurations, the source cell 1204 may configure the HO command signal 1214 to further include cell configuration information concerning the different part or portion of the target cell's configuration that may be utilized by the UE when handing over to the target cell 1206.

After the UE 1202 receives the HO command 1214, the UE initiates switching to the target cell as shown by process

1216. In some aspects, process 1216 may include switching based on a cell match indication as will be discussed in more detail with respect to FIGS. 13 and 14. After the process 1216, the UE 1202 may then initiate communication with the target cell 1206, and indicated in this diagram by an HO complete signal 1218.

Figure 13:
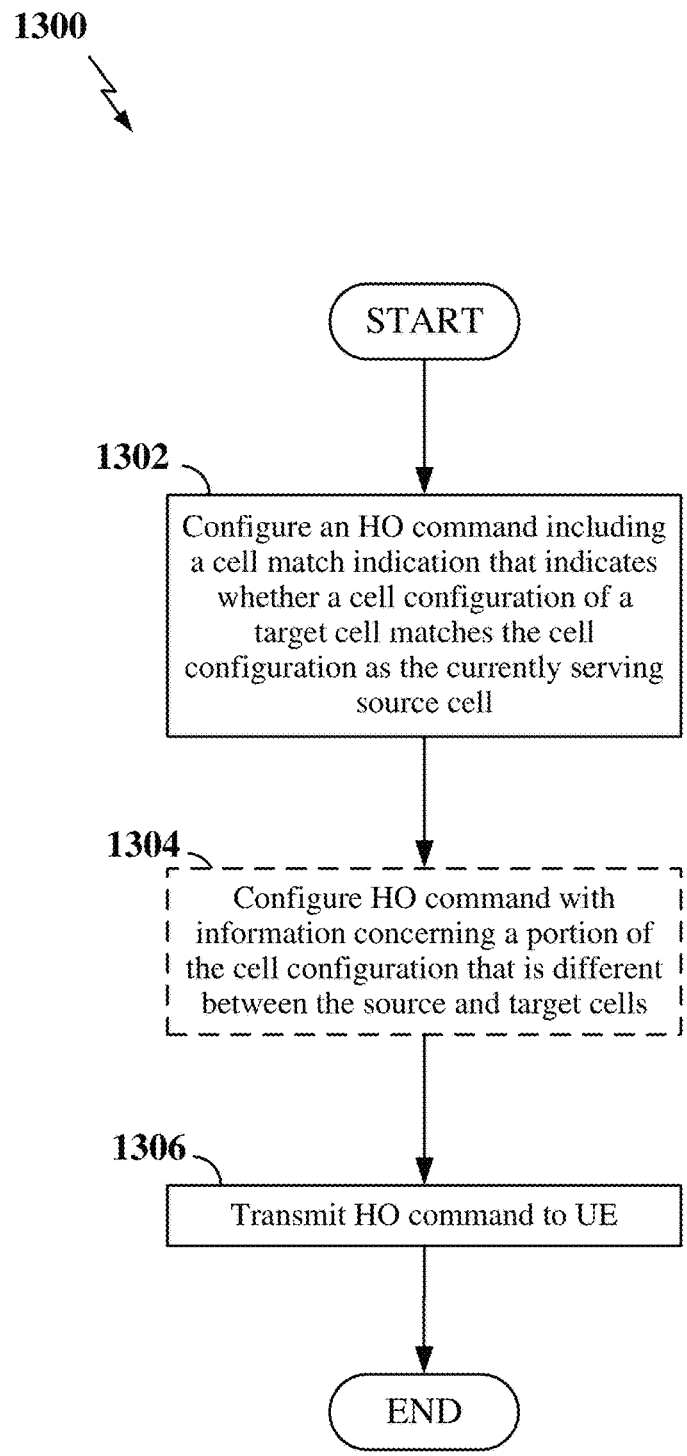
FIG. 13 is a flow chart illustrating a method for selecting handover resources in a RAN entity that will serve a UE in an inter-cell mobility communication system according to some aspects.

FIG. 13 is a flow chart illustrating a method 1300 for selecting handover resources that will serve a UE in an inter-cell mobility communication system in accordance with some aspects of the present disclosure. It is noted that method 1300 may be implemented by base station or gNB, or by a UE functioning as a scheduling entity in other aspects. As illustrated, method 1300 includes configuring a handover (HO) command for a user equipment (UE) being served by a source cell to handover to a target cell, wherein the HO command includes a cell match indication that indicates whether a target cell configuration of the target cell is the same as a source cell configuration of the source cell as shown in block 1302.

In an alternative aspect, method 1300 may further include configuring the HO command with information concerning a portion of the cell configuration that is different between the source and target cells as illustrated in block 1304. Further, method 1300 includes transmitting the HO command to the UE for handover of the UE to the target cell as shown in block 1306.

In further aspects of method 1300, it is noted that the HO command is one of a layer 1 (L1) or layer 2 (L2) signal. Furthermore, the L1 signal comprises at least one downlink control information (DCI), and the L2 signal comprises at least one media access control (MAC) control element (MAC-CE).

In still other aspects, method 1300 may include setting a default cell configuration that is transmitted to the UE, and then also configuring the HO command and the cell match indication to indicate whether the target cell configuration deviates from the default cell configuration.

According to other aspects, it is noted that the cell match indication may constitute an at least one bit field in the HO command. Also, the at least one bit field may be located in one of a field added to the HO command or a repurposed existing field in the HO command.

Figure 14:
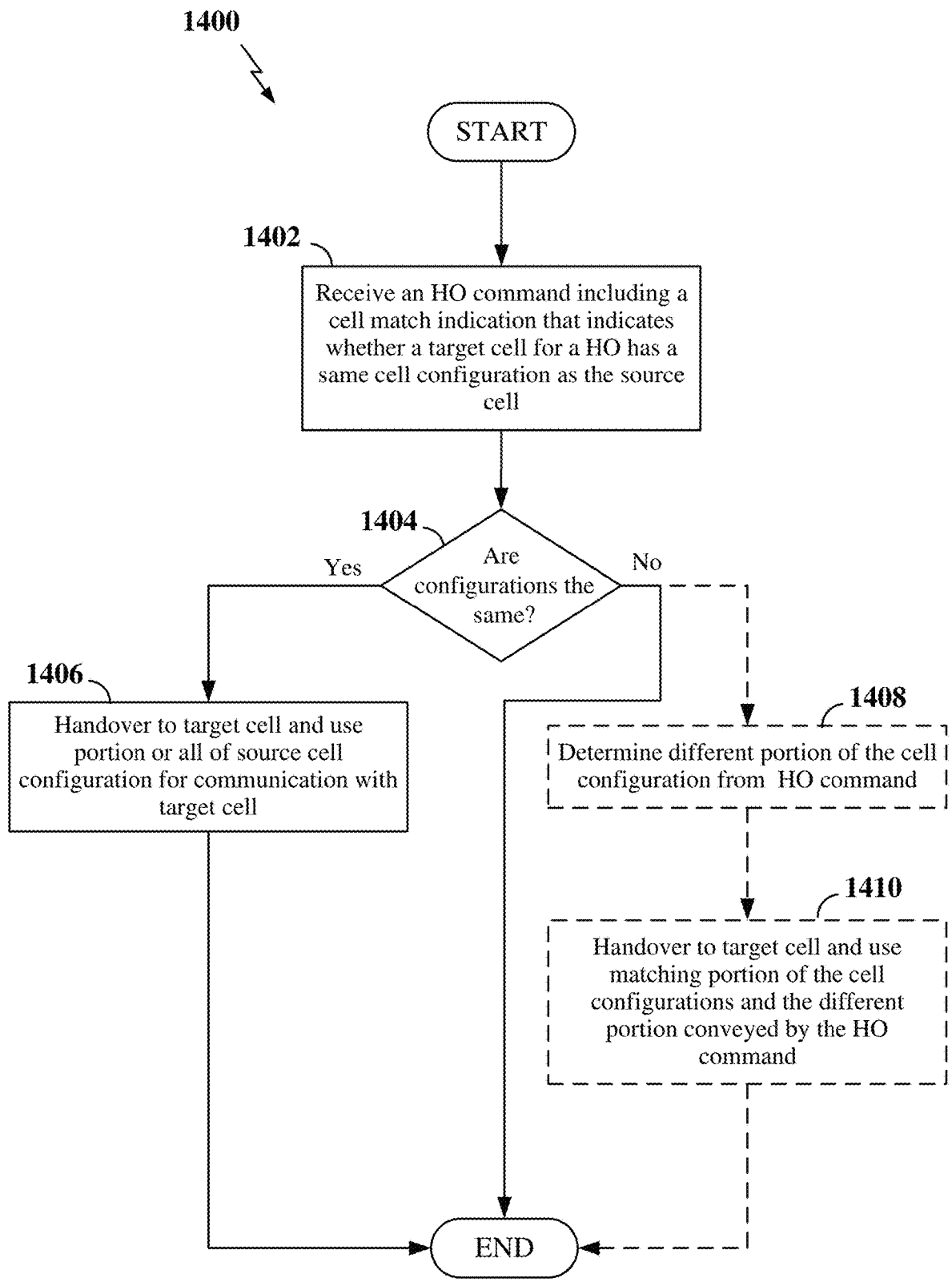
FIG. 14 illustrates a flow chart of still another method for receiving handover resources within a UE in an inter-cell mobility communication system according to some aspects.

FIG. 14 illustrates a flow chart of still another method 1400 for receiving handover resources within a UE in an inter-cell mobility communication system in accordance with some aspects of the present disclosure. Method 1400 may be implemented within a UE or scheduled device in an aspect. In this method 1400, block 1402 indicates first receiving a handover (HO) command in the from a source cell to handover to a target cell. The HO command includes a cell match indication that indicates whether a target cell configuration of the target cell is the same as a source cell configuration of the source cell. Flow may then proceed to decision block 1404 where a determination is made in the UE whether the cell match indication indicates the same configuration or not. If the target and source configurations are the same as determined at block 1404, flow proceeds to block 1406 where the UE switches or is handed over to the target cell based on the HO command including using a portion or the entire source cell configuration that matches the target cell configuration for communication with the target cell.

In a further alternative, it is noted that if the source and target cells do not match as determined in block 1404, flow may proceed to block 1408. In this case, it is assumed that the received HO command is further configured to include information concerning a portion of the target cell configuration that is different between the source cell configuration and the target cell configuration. Thus, method 1400 may further include determining or receiving information concerning the differing portions between the target and source cell configurations from the information in the HO command at block 1408. After this determination, then the UE switches or is handed over to the target cell using at least the portion of the target cell configuration that is different and a portion of the source cell configuration that is the same or matching between the source cell configuration and the target cell configuration as shown in block 1410.

The following provides an overview of aspects of the present disclosure:

Aspect 1: A method for wireless communication at a radio access network (RAN) entity in a communication system supporting inter-cell mobility, the method comprising: receiving a measurement report from at least one user equipment (UE); determining reference information based on the measurement report; selecting at least cell to serve the at least one UE based on the reference information and a serving cell configuration of the RAN entity; and transmitting one of layer 1 (L1) or layer 2 (L2) signaling to the at least one UE to identify the selected at least one cell.

Aspect 2: The method of aspect 1, wherein the at least one cell comprises at least one of a cell site, a serving cell, or a cell assigned with a physical cell ID (PCI).

Aspect 3: The method of aspects 1 or 2, wherein the serving cell configuration of the RAN entity comprises using a single PCI of one or more PCIs, the single PCI associated with a plurality of cell sites, including the at least one cell site, and the method further comprises: transmitting a different set of reference signal IDs for each of the plurality of cell sites.

Aspect 4: The method of any of aspects 1 through 3, where reference signal IDs each comprise at least one of a synchronization signal block (SSB) ID, a channel state information reference signal (CSI-RS), or a positioning reference signal (PRS).

Aspect 5: The method of any of aspects 1 through 4, wherein the serving cell configuration of the RAN entity comprises each serving cell configured to have a plurality of PCIs configured for each serving cell in the communication system and configured to transmit a full set of reference signal IDs, and the method further comprises: identifying through transmitting the L1 or L2 signaling at least one physical cell site, or a corresponding PCI or reference signal (RS) associated with the at least one physical cell site that serves the at least one UE.

Aspect 6: The method of any of aspects 1 through 5, wherein the serving cell configuration of the RAN entity comprises a plurality of cell sites including the at least one cell site, and further comprises a plurality of PCIs including the one or more PCIs, each PCI of the plurality of PCIs corresponding to a different cell site of the plurality of cell sites, and the method further comprising: transmitting, from each of the plurality of cell sites, a plurality of reference signal IDs, each reference signal ID of the plurality of reference signal IDs corresponding to a respective one of the plurality of cell sites; wherein the receiving the measurement report comprises receiving different uplink reference signals at respective cell sites of the plurality of cell sites; wherein determining the reference information comprises determining the reference information corresponding to each of the plurality of cell sites, based on the different uplink reference signals received at the respective cell sites; and wherein the selecting comprises selecting which cell site of the plurality of cell sites will serve the at least one UE.

Aspect 7: The method of any of aspects 1 through 6, wherein the serving cell configuration of the RAN entity comprises a single PCI from one or more PCIs, and the method further comprises: transmitting a serving cell ID signal for the selected at least one cell site.

Aspect 8: The methods method of any of aspects 1 through 7, further comprising: configuring the cell site having a plurality of remote radio heads (RRHs) or at least one cell associated with a plurality of PCIs to transmit a set of synchronization signal block (SSB) IDs (SSB IDs); selecting a respective frequency location in transmission resources for each RRH in the plurality of RRHs or the at least one cell associated with the plurality of PCIs in which to transmit the corresponding set of SSBs IDs for serving the at least one UE; and transmitting each respective frequency location for each RRH in the plurality of RRHs or the at least one cell associated with the PCI in the plurality PCIs to the at least one UE with one of the L1 or L2 signaling.

Aspect 9: The method of aspect 8, further comprising transmitting at least one index via the L1 or L2 signaling, wherein the at least one index indicates at least one selected SSB frequency location.

Aspect 10: The method of aspect 8, further comprising: selecting the respective frequency location for each RRH or the at least one cell associated with the PCI based on an SSB frequency raster, wherein each respective frequency location is set to one of a plurality of frequency locations on the SSB raster.

Aspect 11: The method of aspect 8, further comprising: selecting the respective frequency location for each RRH or the at least one cell associated with the PCI based on an SSB frequency raster, wherein at least one respective frequency locations is set to one of a plurality of frequency locations on the SSB raster and at least one other respective frequency location is set to a frequency location that is off of the SSB raster.

Aspect 12: The method of aspect 8, further comprising: selecting the respective frequency location for each RRH or PCI based on an SSB frequency raster, wherein each respective frequency location is set to a frequency location that is off of the SSB raster.

Aspect 13: The method of aspect 8, further comprising: transmitting the set of SSB IDs with one RRH of the plurality of RRHs or at least one cell associated with the PCI of the plurality PCIs at a frequency location that is on an SSB frequency raster during a period of initial access of the serving cell by the at least one UE, wherein the set of SSB IDs is a full set of SSB IDs on the SSB frequency raster; and permitting transmission of the set of SSB IDs using one or more of the plurality of RRHs or one or more cells associated with the plurality of PCIs after the period of initial access using frequency locations at least one of on or off the SSB frequency raster.

Aspect 14: The method of aspect 8, further comprising: transmitting a respective subset of the set of SSB IDs with a corresponding one RRH the plurality of RRHs or one cell associated with a PCI of the plurality of PCIs at respective frequency locations that are on an SSB frequency raster during a period of initial access of the serving cell by the at least one UE, wherein the totality of the respective subsets comprises a full set of SSB IDs on the SSB frequency raster; and permitting transmission of the set of SSB IDs using one or more of the plurality of RRHs or one or more cells associated with a PCI of the plurality of PCIs after the period of initial access using frequency locations at least one of on or off the SSB frequency raster.

Aspect 15: The method of any of aspects 1 through 14, further comprising: configuring a handover (HO) command for the at least one UE that is being served by a source cell to handover to a target cell, wherein the HO command includes a cell match indication that indicates whether a target cell configuration of the target cell is the same as a source cell configuration of the source cell; and transmitting the HO command to the at least one UE for handover of the at least one UE to the target cell, wherein the HO command is one of the L1 or L2 signaling.

Aspect 16: The method of any of aspects 1 through 15, wherein the measurement report comprises one of a reference signal receive power (RSRP) measurement signal, a signal-to-interference-and-noise ratio (SINR) measurement signal, or a reference signal received quality (RSRQ) measurement signal.

Aspect 17: The method of any of aspects 1 through 16, wherein the L1 signaling comprises at least downlink control information (DCI) and the L2 signaling comprises at least one MAC control element (MAC-CE).

Aspect 18: A method for wireless communication at a user equipment (UE) in a wireless communication system supporting inter-cell mobility, the method comprising: transmitting an uplink reference signal to a radio access network (RAN) entity that includes at least one of power and signal measurements; receiving one of layer 1 (L1) or layer 2 (L2) signaling from the RAN entity that identifies one or more selected serving cells to serve the UE based on the transmitted uplink reference signal; and selecting one or more serving cells during inter-cell mobility operations based on the received L1 or L2 layer signaling.

Aspect 19. The method of aspect 18, further comprising: the UE configured to operate according to at least one of a plurality of operation modes of the communication system, the operation modes comprising one of: (1) each serving cell in the communication system having one PCI and a plurality of physical cell sites, wherein each physical cell site is configured to transmit a different set of cell-defining reference signals and the L1 or L2 layer signaling configured to select a physical cell site to serve the UE based on the uplink reference signal; (2) each serving cell in the communication system having a plurality of PCIs and a plurality of physical cell sites, wherein each physical cell site is configured to utilize a PCI of the plurality of PCIs and is configured to transmit a full set of cell-defining reference signals and the L1 or L2 layer signaling configured to select a physical cell site to serve the UE based on the uplink reference signal for each PCI reported by the uplink reference signal; or (3) each serving cell in the communication system having one PCI, wherein the L1 or L2 layer signaling is configured to select a serving cell of the one or more serving cells or a serving cell ID corresponding to the selected serving cell based on the uplink reference signal for each PCI reported by the uplink reference signal.

Aspect 20: The method of aspects 18 or 19, wherein the L1 or L2 controls include at least one of one of downlink control information (DCI) or MAC control elements (MAC-CEs); and wherein the uplink reference signal comprises one of a reference signal receive power (RSRP) measurement signal, a signal to interference plus noise ratio (SINR) measurement signal, or a reference signal received quality (RSRQ) measurement signal.

Aspect 21. The method of any of aspects 18 through 20, further comprising: receiving a transmission including a set of synchronization signal block (SSB) IDs (SSB IDs) from one of a plurality of remote radio heads (RRH) or from at least one cell associated with one of a plurality of physical cell IDs (PCIs) in the at least one serving cell, wherein the SSB ID's are selectively located at respective frequency locations for each RRH in the plurality of RRHs or each cell associated with the plurality of PCIs and respective frequency locations are selectively located with the use of layer 1 (L1) or layer 2 (L2) signaling; and performing wireless transmissions between the UE and the at least one serving cell using the received set of SSB IDs.

Aspect 22: The method of aspect 21, further comprising: receiving in the transmission at least one index via the L1 or L2 controls, wherein the at least one index indicates at least one selected SSB frequency location.

Aspect 23: The method of aspect 21, selectively locating the SSB IDs in the respective frequency location for each RRH or each cell associated with a PCI is based on an SSB frequency raster, wherein each respective frequency location is set to one of a plurality of frequency locations on the SSB raster.

Aspect 24: The method of aspect 21, wherein selectively locating the SSB IDs in the respective frequency location for each RRH or each cell associated with a PCI is based on an SSB frequency raster, wherein at least one respective frequency locations is set to one of a plurality of frequency locations on the SSB raster and at least one other respective frequency location is set to a frequency location that is off of the SSB raster.

Aspect 25: The method of aspect 21, wherein selectively locating the SSB IDs in the respective frequency location for each RRH or each cell associated with a PCI is based on an SSB frequency raster, wherein each respective frequency location is set to a frequency location that is off of the SSB raster.

Aspect 26: The method of aspect 21, further comprising: receiving the set of SSB IDs with one RRH of the plurality of RRHs or one cell associated with a PCI of the plurality PCIs at a frequency location that is on an SSB frequency raster during a period of initial access of the serving cell by the at least one UE, wherein the set of SSB IDs is a full set of SSB IDs on the SSB frequency raster, wherein transmission of the set of SSB IDs is permitted based on one or more of the plurality of RRHs or PCIs after the period of initial access using frequency locations at least one of on or off the SSB frequency raster.

Aspect 27: The method of any of aspects 18 through 26, further comprising: receiving a handover (HO) command in a user equipment (UE) from a source cell to handover to a target cell, wherein the HO command includes a cell match indication that indicates whether a target cell configuration of the target cell is the same as a source cell configuration of the source cell; and handing over to the target cell in the UE based on the HO command including using a portion of the source cell configuration that matches the target cell configuration for communication with the target cell. wherein the HO command is one of a layer 1 (L1) or layer 2 (L2) signal.

Aspect 28: The method of any of aspects 18 through 27, further comprising: the HO command configured to include information concerning a portion of the target cell configuration that is different between the source cell configuration and the target cell configuration; determining whether the cell match indication indicates a difference between the source cell configuration and the target cell configuration; and handing over to the target cell using at least the portion of the target cell configuration that is different and a portion of the source cell configuration that is the same between the source cell configuration and the target cell configuration when the difference is indicated.

Aspect 29: A radio access network (RAN) entity configured for wireless communication comprising a processor, a transceiver communicatively coupled to the processor, and a memory coupled to the processor, the processor and memory configured to perform a method of any one of aspects 1 through 17.

Aspect 30: A user equipment (UE) configured for wireless communication comprising a processor, a transceiver communicatively coupled to the processor, and a memory coupled to the processor, the processor and memory configured to perform a method of any one of aspects 18 through 28.

Aspect 31: An apparatus configured for wireless communication comprising at least means for performing a method of any one of aspects 1 through 17 or, alternatively, aspects 18 through 28.

Aspect 32: A non-transitory computer-readable medium storing computer-executable code, comprising code for causing an apparatus to perform a method of any one of aspects 1 through 17 or, alternatively, aspects 18 through 28.

Several aspects of a wireless communication network have been presented with reference to various exemplary implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication at a radio access network entity in a communication system, the communication system supporting inter-cell mobility, the method comprising:
   receiving at least one measurement report from at least one user equipment;
   determining reference information based on the at least one measurement report;
   selecting at least one cell to serve the at least one user equipment based on the reference information and a serving cell configuration of the radio access network entity; and
   transmitting one of layer 1 signaling or layer 2 signaling to the at least one user equipment to identify the at least one cell,
   wherein the serving cell configuration of the radio access network entity corresponds to at least one of a plurality of operation modes of the communication system, the plurality of operation modes comprising one of:
   (1) a first operation mode with each serving cell in the communication system having one physical cell ID and a first plurality of physical cell sites, wherein each physical cell site of the first plurality of physical cell sites is configured to transmit a different set of cell-defining reference signals and the layer 1 signaling or the layer 2 signaling is configured to select a first physical cell site of the first plurality of physical cell sites to serve the at least one user equipment based on the reference information; or
   (2) a second operation mode with each serving cell in the communication system having a plurality of physical cell IDs and a second plurality of physical cell sites, wherein each physical cell site of the second plurality of physical cell sites is configured to utilize a physical cell ID of the plurality of physical cell IDs and is configured to transmit a full set of cell-defining reference signals and the layer 1 signaling or the layer 2 signaling is configured to select a second physical cell site of the second plurality of physical cell sites to serve the at least one user equipment based on the reference information for each physical cell ID reported by the at least one measurement report; or
   (3) a third operation mode with each serving cell in the communication system having one physical cell ID, wherein the layer 1 signaling or the layer 2 signaling is configured to select a first serving cell of the at least one cell or a serving cell ID corresponding to the first serving cell based on the reference information for each physical cell ID reported by the at least one measurement report.

2. The method of claim 1, wherein the at least one cell comprises at least one of a cell site, a serving cell, or a cell assigned with a physical cell identity.

3. The method of claim 1, wherein the serving cell configuration of the radio access network entity comprises, for the first operation mode, using a single physical cell ID of one or more physical cell IDs, the single physical cell ID associated with a plurality of cell sites, including the at least one cell, and the method further comprises:
   transmitting a different set of reference signal IDs for each of the plurality of cell sites.

4. The method of claim 3, where the different set of reference signal IDs for each of the plurality of cell sites each comprise at least one of a synchronization signal block (SSB) ID, a channel state information reference signal (CSI-RS), or a positioning reference signal (PRS).

5. The method of claim 1, wherein the serving cell configuration of the radio access network entity comprises, for the second operation mode, each serving cell in the communication system configured to transmit a full set of reference signal IDs, and the method further comprises:
   identifying through transmitting the layer 1 signaling or the layer 2 signaling at least one physical cell site of the second plurality of physical cell sites, or a corresponding physical cell ID or reference signal (RS) associated with the at least one cell.

6. The method of claim 5, wherein the serving cell configuration of the radio access network entity comprises, for the second operation mode, a plurality of cell sites including the at least one cell, and each physical cell ID of the plurality of physical cell IDs corresponding to a different cell site of the plurality of cell sites, and the method further comprising:
   transmitting, from each of the plurality of cell sites, a plurality of reference signal IDs, each reference signal ID of the plurality of reference signal IDs corresponding to a respective one of the plurality of cell sites;

wherein the receiving the at least one measurement report comprises receiving different uplink reference signals at respective cell sites of the plurality of cell sites;

wherein the determining the reference information comprises determining the reference information corresponding to each of the plurality of cell sites, based on the different uplink reference signals received at the respective cell sites; and wherein the selecting comprises selecting which cell site of the plurality of cell sites will serve the at least one user equipment.

7. The method of claim 1, wherein the serving cell configuration of the radio access network entity comprises, for the third operation mode, a single physical cell ID from one or more physical cell IDs, and the method further comprises:

transmitting a serving cell ID signal for the at least one cell.

8. The method of claim 1, further comprising:

configuring a cell site having a plurality of remote radio heads or at least one first cell associated with the plurality of physical cell IDs to transmit a set of synchronization signal block IDs;

selecting a respective frequency location in transmission resources for each remote radio head in the plurality of remote radio heads or for the at least one first cell associated with a first physical cell ID in the plurality of physical cell IDs in which to transmit the set of synchronization signal block IDs for serving the at least one user equipment; and transmitting each respective frequency location for each remote radio head in the plurality of remote radio heads or the at least one first cell associated with the first physical cell ID in the plurality of physical cell IDs to the at least one user equipment with one of the layer 1 signaling or the layer 2 signaling.

9. The method of claim 8, further comprising:

transmitting at least one index via the layer 1 signaling or the layer 2 signaling, wherein the at least one index indicates at least one selected synchronization signal block frequency location.

10. The method of claim 8, further comprising:

selecting the respective frequency location for each remote radio head in the plurality of remote radio heads or for the at least one first cell associated with the first physical cell ID based on a synchronization signal block frequency raster, wherein each respective frequency location of the respective frequency location for each remote radio head or the at least one first cell is set to one of a plurality of frequency locations on the synchronization signal block frequency raster.

11. The method of claim 8, further comprising:

selecting the respective frequency location for each remote radio head in the plurality of remote radio heads or for the at least one first cell associated with the first physical cell ID based on a synchronization signal block frequency raster, wherein at least one respective frequency location of the respective frequency location for each remote radio head or the at least one first cell is set to one of a plurality of frequency locations on the synchronization signal block frequency raster and at least one other respective frequency location of the respective frequency location for each remote radio head or the at least one first cell is set to a frequency location that is off of the synchronization signal block frequency raster.

12. The method of claim 8, further comprising:

selecting the respective frequency location for each remote radio head in the plurality of remote radio heads or for the at least one first cell associated with the first physical cell ID PCI based on a synchronization signal block frequency raster, wherein each respective frequency location of the respective frequency location for each remote radio head or the at least one first cell is set to a frequency location that is off of the synchronization signal block frequency raster.

13. The method of claim 8, further comprising:

transmitting the set of synchronization signal block IDs with one remote radio head of the plurality of remote radio heads or the at least one first cell associated with the first physical cell ID of the plurality of physical cell IDs at a frequency location that is on a synchronization signal block frequency raster during a period of initial access of a serving cell of the at least one cell by the at least one user equipment, wherein the set of synchronization signal block IDs is a full set of synchronization signal block IDs on the synchronization signal block frequency raster; and permitting transmission of the set of synchronization signal block IDs using one or more of the plurality of remote radio heads or one or more cells associated with the plurality of physical cell IDs after the period of initial access using frequency locations at least one of on or off the synchronization signal block frequency raster.

14. The method of claim 8, further comprising:

transmitting a respective subset of the set of synchronization signal block IDs with a corresponding one remote radio head of the plurality of remote radio heads or one cell associated with the first physical cell ID of the plurality of physical cell IDs at respective frequency locations that are on a synchronization signal block frequency raster during a period of initial access of a serving cell of the at least one cell by the at least one user equipment, wherein a totality of transmitted respective subsets comprises a full set of synchronization signal block IDs on the synchronization signal block frequency raster; and permitting transmission of the set of synchronization signal block IDs using one or more of the plurality of remote radio heads or one or more cells associated with the first physical cell ID of the plurality of physical cell IDs after the period of initial access using frequency locations at least one of on or off the synchronization signal block frequency raster.

15. The method of claim 1, further comprising:

configuring a handover command for the at least one user equipment that is being served by a source cell to handover to a target cell, wherein the handover command includes a cell match indication that indicates whether a target cell configuration of the target cell is the same as a source cell configuration of the source cell; and transmitting the handover command to the at least one user equipment for handover of the at least one user equipment to the target cell, wherein the handover command is one of the layer 1 signaling or the layer 2 signaling.

16. The method of claim 1, wherein the reference information comprises one of a reference signal receive power (RSRP) measurement signal, a signal-to-interference-and-noise ratio (SINR) measurement signal, or a reference signal received quality (RSRQ) measurement signal.

17. The method of claim 1, wherein the layer 1 signaling comprises at least downlink control information (DCI) and the layer 2 signaling comprises at least one MAC control element (MAC-CE).

18. A method for wireless communication at a user equipment in a communication system, the communication system supporting inter-cell mobility, the method comprising:
transmitting an uplink reference signal to a radio access network entity, the uplink reference signal comprising at least one of power and signal measurements;
receiving one of layer 1 signaling or the layer 2 signaling from the radio access network entity that identifies one or more selected serving cells to serve the user equipment based on the transmitted uplink reference signal; and
selecting one or more serving cells during inter-cell mobility operations based on the layer 1 signaling or the layer 2 signaling,
wherein the user equipment is configured to operate according to at least one of a plurality of operation modes of the communication system, the plurality of operation modes comprising one of:
(1) each serving cell in the communication system having one physical cell ID and a first plurality of physical cell sites, wherein each physical cell site of the first plurality of physical cell sites is configured to transmit a different set of cell-defining reference signals and the layer 1 signaling or the layer 2 signaling is configured to select a first physical cell site of the first plurality of physical cell sites to serve the user equipment based on the uplink reference signal; or
(2) each serving cell in the communication system having a plurality of physical cell IDs and a second plurality of physical cell sites, wherein each physical cell site of the second plurality of physical cell sites is configured to utilize a physical cell ID of the plurality of physical cell IDs and is configured to transmit a full set of cell-defining reference signals and the layer 1 signaling or the layer 2 signaling is configured to select a second physical cell site of the second plurality of physical cell sites to serve the user equipment based on the uplink reference signal for each physical cell ID reported by the uplink reference signal; or
(3) each serving cell in the communication system having one physical cell ID, wherein the layer 1 signaling or the layer 2 signaling is configured to select a first serving cell of the one or more serving cells or a serving cell ID corresponding to the first serving cell based on the uplink reference signal for each physical cell ID reported by the uplink reference signal.

19. The method of claim 18,
wherein the layer 1 signaling or the layer 2 signaling includes at least one of one of downlink control information (DCI) or MAC control elements (MAC-CEs); and
wherein the uplink reference signal comprises one of a reference signal receive power (RSRP) measurement signal, a signal to interference plus noise ratio (SINR) measurement signal, or a reference signal received quality (RSRQ) measurement signal.

20. The method of claim 18, further comprising:
receiving a transmission including a set of synchronization signal block IDs from one of a plurality of remote radio heads or from at least one cell associated with one of the plurality of physical cell IDs of the one or more serving cells, wherein the set of synchronization signal block IDs are selectively located at respective frequency locations for each remote radio head in the plurality of remote radio heads or for each cell associated with the plurality of physical cell IDs, and the respective frequency locations are selectively located with use of the layer 1 signaling or the layer 2 signaling; and
performing wireless transmissions between the user equipment and the one or more serving cells using the set of synchronization signal block IDs.

21. The method of claim 20, further comprising:
receiving in the transmission at least one index via the layer 1 signaling or the layer 2 signaling, wherein the at least one index indicates at least one selected synchronization signal block frequency location.

22. The method of claim 20, wherein selectively locating the set of synchronization signal block IDs in the respective frequency locations for each remote radio head in the plurality of remote radio heads or for each cell associated with a physical cell ID of the plurality of physical cell IDs is based on a synchronization signal block frequency raster, wherein each respective frequency location of the respective frequency locations is set to one of a plurality of frequency locations on the synchronization signal block frequency raster.

23. The method of claim 20, wherein selectively locating the set of synchronization signal block IDs in the respective frequency locations for each remote radio head in the plurality of remote radio heads or for each cell associated with a physical cell ID of the plurality of physical cell IDs is based on a synchronization signal block frequency raster, wherein at least one respective frequency location of the respective frequency locations is set to one of a plurality of frequency locations on the synchronization signal block frequency raster and at least one other respective frequency location of the respective frequency locations is set to a frequency location that is off of the synchronization signal block frequency raster.

24. The method of claim 20, wherein selectively locating the set of synchronization signal block IDs in the respective frequency location for each remote radio head in the plurality of remote radio heads or for each cell associated with a physical cell ID of the plurality of physical cell IDs is based on a synchronization signal block frequency raster, wherein each respective frequency location of the respective frequency locations is set to a frequency location that is off of the synchronization signal block frequency raster.

25. The method of claim 20, further comprising:
receiving the set of synchronization signal block IDs with one remote radio head of the plurality of remote radio heads or one cell associated with a physical cell ID of the plurality of physical cell IDs at a frequency location that is on a synchronization signal block frequency raster during a period of initial access of a serving cell of the one or more serving cells by the user equipment, wherein the set of synchronization signal block IDs is a full set of synchronization signal block IDs on the synchronization signal block frequency raster, wherein transmission of the set of synchronization signal block IDs is permitted based on one or more of the plurality of remote radio heads or the plurality of physical cell IDs after the period of initial access using frequency locations at least one of on or off the synchronization signal block frequency raster.

26. The method of claim 18, further comprising:
receiving a handover command from a source cell to handover the user equipment to a target cell, wherein the handover command includes a cell match indication that indicates whether a target cell configuration of the target cell is the same as a source cell configuration of the source cell; and
handing over the user equipment to the target cell based on the handover command including using a portion of the source cell configuration that matches the target cell configuration for communication with the target cell, wherein the layer 1 signaling or the layer 2 signaling comprises the handover command.

27. The method of claim 26, wherein:
the handover command is further configured to include information concerning a first portion of the target cell configuration that is different between the source cell configuration and the target cell configuration;
the method further comprises determining whether the cell match indication indicates a difference between the source cell configuration and the target cell configuration; and
the method further comprises handing over the user equipment to the target cell using at least the first portion of the target cell configuration that is different and a second portion of the source cell configuration that is the same between the source cell configuration and the target cell configuration when the difference is indicated.

28. A radio access network entity configured for wireless communication, comprising:
a processor;
a transceiver communicatively coupled to the processor; and
a memory coupled to the processor,
wherein the processor and the memory are configured to:
receive at least one measurement report from at least one user equipment via the transceiver;
determine reference information based on the at least one measurement report;
select at least one cell to serve the at least one user equipment based on the reference information and a serving cell configuration of the radio access network entity; and
transmit one of layer 1 signaling or layer 2 signaling via the transceiver to the at least one user equipment to identify the at least one cell,
wherein the serving cell configuration of the radio access network entity corresponds to at least one of a plurality of operation modes of a communication system, the plurality of operation modes comprising one of:
(1) each serving cell in the communication system having one physical cell ID and a first plurality of physical cell sites, wherein each physical cell site of the first plurality of physical cell sites is configured to transmit a different set of cell-defining reference signals and the layer 1 signaling or the layer 2 signaling is configured to select a first physical cell site of the first plurality of physical cell sites to serve the at least one user equipment based on the reference information; or
(2) each serving cell in the communication system having a plurality of physical cell IDs and a second plurality of physical cell sites, wherein each physical cell site of the second plurality of physical cell sites is configured to utilize a physical cell ID of the plurality of physical cell IDs and is configured to transmit a full set of cell-defining reference signals and the layer 1 signaling or the layer 2 signaling is configured to select a second physical cell site of the second plurality of physical cell sites to serve the at least one user equipment based on the reference information for each physical cell ID reported by the at least one measurement report; or
(3) each serving cell in the communication system having one physical cell ID, wherein the layer 1 signaling or the layer 2 signaling is configured to select a first serving cell of the at least one cell or a serving cell ID corresponding to the first serving cell based on the reference information for each physical cell ID reported by the at least one measurement report.

29. A user equipment (UE) configured for wireless communication, comprising:
a processor;
a transceiver communicatively coupled to the processor; and
a memory coupled to the processor,
wherein the processor and the memory are configured to:
transmit an uplink reference signal to a radio access network entity of a communication system, the uplink reference signal comprising at least one of power and signal measurements;
receive one of layer 1 signaling or layer 2 signaling from the radio access network entity that identifies one or more selected serving cells to serve the user equipment based on the transmitted uplink reference signal; and
select one or more serving cells during inter-cell mobility operations based on the layer 1 signaling or the layer 2 signaling,
wherein the user equipment is further configured to operate according to at least one of a plurality of operation modes of the communication system, the plurality of operation modes comprising one of:
(1) each serving cell in the communication system having one physical cell ID and a first plurality of physical cell sites, wherein each physical cell site of the first plurality of physical cell sites is configured to transmit a different set of cell-defining reference signals and the layer 1 signaling or the layer 2 signaling is configured to select a first physical cell site of the first plurality of physical cell sites to serve the user equipment based on the uplink reference signal; or
(2) each serving cell in the communication system having a plurality of physical cell IDs and a second plurality of physical cell sites, wherein each physical cell site of the second plurality of physical cell sites is configured to utilize a physical cell ID of the plurality of physical cell IDs and is configured to transmit a full set of cell-defining reference signals and the layer 1 signaling or the layer 2 signaling is configured to select a second physical cell site of the second plurality of physical cell sites to serve the user equipment based on the uplink reference signal for each physical cell ID reported by the uplink reference signal; or
(3) each serving cell in the communication system having one physical cell ID, wherein the layer 1 signaling or the layer 2 signaling is configured to select a first serving cell of the one or more serving cells or a serving cell ID corresponding to the first serving cell based on the uplink reference signal for each physical cell ID reported by the uplink reference signal.

30. The method of claim 1, wherein the selection of the first physical cell site of the first plurality of physical cell sites to serve the at least one user equipment based on the reference information comprises:

selecting a remote radio head, a set of remote radio heads, or a set of synchronization signal blocks to serve the at least one user equipment based on one of a reference signal receive power (RSRP) measurement signal, a signal to interference plus noise ratio (SINR) measurement signal, or a reference signal received quality (RSRQ) measurement signal, reported for each cell-defining reference signal of the different set of cell-defining reference signals.

31. The method of claim 1, wherein the selection of the second physical cell site of the second plurality of physical cell sites to serve the at least one user equipment based on the reference information for each physical cell ID reported by the at least one measurement report comprises:

selecting a remote radio head, a set of remote radio heads, a set of synchronization signal blocks, or at least one physical cell ID of the plurality of physical cell IDs to serve the at least one user equipment based on one of a reference signal receive power (RSRP) measurement signal, a signal to interference plus noise ratio (SINR) measurement signal, or a reference signal received quality (RSRQ) measurement signal, reported for each cell-defining reference signal of the full set of cell-defining reference signals for each reported physical cell ID.

32. The method of claim 1, wherein the selection of the first serving cell of the at least one cell or the serving cell ID corresponding to the first serving cell based on the reference information for each physical cell ID reported by the at least one measurement report comprises:

selecting the at least one cell or the serving cell ID corresponding to the first serving cell to serve the at least one user equipment based on one of a reference signal receive power (RSRP) measurement signal, a signal to interference plus noise ratio (SINR) measurement signal, or a reference signal received quality (RSRQ) measurement signal, reported for each cell-defining reference signal for each reported physical cell ID.

33. The method of claim 18, wherein the selection of the first physical cell site of the first plurality of physical cell sites to serve the user equipment based on the uplink reference signal comprises:

selecting a remote radio head, a set of remote radio heads, or a set of synchronization signal blocks to serve the user equipment based on one of a reference signal receive power (RSRP) measurement signal, a signal to interference plus noise ratio (SINR) measurement signal, or a reference signal received quality (RSRQ) measurement signal, reported for each cell-defining reference signal of the different set of cell-defining reference signals.

34. The method of claim 18, wherein the selection of the second physical cell site of the second plurality of physical cell sites to serve the user equipment based on the uplink reference signal for each physical cell ID reported by the uplink reference signal comprises:

selecting a remote radio head, a set of remote radio heads, a set of synchronization signal blocks, or at least one physical cell ID of the plurality of physical cell IDs to serve the user equipment based on one of a reference signal receive power (RSRP) measurement signal, a signal to interference plus noise ratio (SINR) measurement signal, or a reference signal received quality (RSRQ) measurement signal, reported for each cell-defining reference signal of the full set of cell-defining reference signals for each reported physical cell ID.

35. The method of claim 18, wherein the selection of the first serving cell of the one or more serving cells or the serving cell ID corresponding to the first serving cell based on the uplink reference signal for each physical cell ID reported by the uplink reference signal comprises:

selecting the first serving cell of the one or more serving cells or the serving cell ID corresponding to the first serving cell to serve the user equipment based on one of a reference signal receive power (RSRP) measurement signal, a signal to interference plus noise ratio (SINR) measurement signal, or a reference signal received quality (RSRQ) measurement signal, reported for each cell-defining reference signal for each reported physical cell ID.

* * * * *